US009009062B2

(12) United States Patent
Mannino et al.

(10) Patent No.: US 9,009,062 B2
(45) Date of Patent: Apr. 14, 2015

(54) FACILITATING CORPORATE TENDERS/DUTCH AUCTION TENDERS AND COMPUTER-IMPLEMENTED METHODS AND COMPUTER SYSTEMS THEREOF

(71) Applicant: Broadridge Financial Solutions, Inc., Jersey City, NJ (US)

(72) Inventors: Joseph Mannino, Edgewood, NY (US); Edwin Crespo, Edgewood, NY (US)

(73) Assignee: Broadridge Financial Solutions, Inc., Jersey City, NJ (US)

( * ) Notice: Subject to any disclaimer, the term of this patent is extended or adjusted under 35 U.S.C. 154(b) by 0 days.

(21) Appl. No.: 14/217,197

(22) Filed: Mar. 17, 2014

(65) Prior Publication Data

US 2014/0278836 A1    Sep. 18, 2014

Related U.S. Application Data

(60) Provisional application No. 61/799,063, filed on Mar. 15, 2013.

(51) Int. Cl.
*G06F 11/00* (2006.01)
*G06Q 40/04* (2012.01)
*G07C 13/00* (2006.01)
*H04H 60/33* (2008.01)

(52) U.S. Cl.
CPC ............... *G06Q 40/04* (2013.01); *G07C 13/00* (2013.01); *H04H 60/33* (2013.01)

(58) Field of Classification Search
USPC .......................................... 705/12
See application file for complete search history.

(56) References Cited

U.S. PATENT DOCUMENTS

| 2001/0037234 | A1* | 11/2001 | Parmasad et al. ............... 705/12 |
| 2003/0062408 | A1* | 4/2003 | Barmettler et al. ............ 235/51 |
| 2003/0182177 | A1* | 9/2003 | Gallagher et al. .............. 705/10 |
| 2005/0218224 | A1* | 10/2005 | Boldin .......................... 235/386 |
| 2008/0296375 | A1* | 12/2008 | Haas et al. .................... 235/386 |

OTHER PUBLICATIONS

International Search Report and Written Opinion from International Application No. PCT/US14/30808 dated May 21, 2014.

* cited by examiner

*Primary Examiner* — Tsan-Yu J Huang
(74) *Attorney, Agent, or Firm* — Greenberg Traurig, LLP

(57) ABSTRACT

In some embodiments, the instant invention provides a programmed system having a computer programmed with software instructions that include at least: code to receive an electronic Tender voting request to conduct a Tender voting; where the Tender voting is limited to a plurality of employees who has owned shares of an issuer at a record date via at least one of: i) at least one 401K plan, and ii) at least one employee stock ownership plan (ESOP); where the Tender voting is selected from the group of Tender voting types consisting of: i) a Tender offer, ii) an All-or-None Tender offer, and iii) a Dutch Tender auction; code to identify the plurality of employees; code to generate a plurality of programmed visual computer screens to allow the plurality of employees to submit Tender votes; and code to dynamically output a report identifying a progress of the Tender voting.

14 Claims, 21 Drawing Sheets

| Security Name | Job Number | Election Date | Election Time | CUSIP | Class | Account Number | Number of Shares | Percentage Tendered | Percentage not Tendered | Tendered Shares | 12 Digit Control Number | Tender % @TENDER OFFER AMYLIN | Election Shares @TENDER OFFER AMYLIN |
|---|---|---|---|---|---|---|---|---|---|---|---|---|---|
| VIRGINIA RAILROAD | 546736 | 8-Nov-12 | 13:36:32 | 714819 | 401 | N0002 | 780,048 | 50 | 50 | 390,024 | 181398544828 | 50 | 390,024 |

*Fig. 17*

FACILITATING CORPORATE TENDERS/DUTCH AUCTION TENDERS AND COMPUTER-IMPLEMENTED METHODS AND COMPUTER SYSTEMS THEREOF

RELATED APPLICATIONS

This application claims the priority of U.S. provisional application Ser. No. 61/799,063, filed Mar. 15, 2013, entitled "DESIGN TO THE ELECTION PROCESS OF A CORPORATE ACTION," which is incorporated herein by reference in its entirety for all purposes.

TECHNICAL FIELD

In some embodiments, the present invention relates to facilitating corporate tenders/Dutch auction tenders and computer-implemented methods and computer systems utilized for running the corporate tenders/Dutch auction tenders.

BACKGROUND

Typically, a tender offer is a broad solicitation by a company or a third party to purchase a substantial percentage of a company's Section 12 registered equity shares or units for a limited period of time. Typically, the offer is at a fixed price, usually at a premium over the current market price, and is customarily contingent on shareholders tendering a fixed number of their shares or units. Typically, under the Securities Exchange Act of 1934, parties who will own more than five percent of a class of the company's securities after making a tender offer for securities registered under the Exchange Act must file a Schedule TO with the SEC. Typically, the SEC also requires any person acquiring more than five percent of a voting class of a company's Section 12 registered equity securities directly or by tender offer to file a Schedule 13D.

Typically, the filings required by Section 14(d) of the Exchange Act and Regulation 14D provide information to the public about persons other than the company who make a tender offer. Typically, the company that is the subject of the takeover must file with the SEC its response to the tender offer on Schedule 14D-9. Typically, the rules also set time limits for the tender offer and provide other protections to shareholders. Typically, when a public company makes a tender offer for a class of its own equity securities, it similarly must file a Schedule TO and may also need to file a Schedule 13E-3. Typically, except for the anti-fraud and a few other provisions of Regulation 14E, the SEC's tender offer rules generally do not apply to tender offers that result in ownership of five percent or less of the outstanding shares—also known as "mini-tender offers."

Typically, Dutch auction share repurchase allows firms an alternative to the fixed price tender offer when executing a tender offer share repurchase. Typically, a Dutch auction offer specifies a price range within which the shares will ultimately be purchased. Typically, shareholders are invited to tender their stock, if they desire, at any price within the stated range. Typically, the firm then compiles these responses, creating a supply curve for the stock. Typically, the purchase price is the lowest price that allows the firm to buy the number of shares sought in the offer, and the firm pays that price to all investors who tendered at or below that price. Typically, if the number of shares tendered exceeds the number sought, then the company purchases less than all shares tendered at or below the purchase price on a pro rata basis to all who tendered at or below the purchase price. Typically, if too few shares are tendered, then the firm either cancels the offer (provided it had been made conditional on a minimum acceptance), or it buys back all tendered shares at the maximum price. An example of a Dutch auction is when the auctioneer starts at $2,000 for an object. If there are no bidders, the price is lowered by $100. The object will be sold once a bidder accepts the last price announced by the auctioneer, say $1,500.

BRIEF SUMMARY OF INVENTION

In some embodiments, the instant invention provides a the instant invention provides a computer-implemented method that includes at least steps of: receiving, by a specifically programed processing computer system, an electronic Tender voting request to conduct at least one Tender voting; where the electronic Tender voting request identifies at least the following: i) at least one security of at least one issuer, and ii) a Tender deadline for the at least one Tender voting to submit Tender votes, iii) at least one condition of the at least one Tender voting; where the at least one Tender voting is limited to a plurality of employees who has owned shares of the at least one issuer at a record date via at least one of: i) at least one 401K plan, and ii) at least one employee stock ownership plan (ESOP); where the at least one Tender voting is selected from the group of Tender voting types consisting of: i) a Tender offer, ii) an All-or-None Tender offer, and iii) a Dutch Tender auction; based on the electronic Tender voting request, identifying, by the specifically programed processing computer system, the plurality of employees who own the shares of the at least one issuer on the record date; generating, by the specifically programed processing computer system, a Tender control number for each employee of the plurality of employees; where the Tender control number includes at least at least one Tender tag; where the Tender control number is associated in data records with at least: i) such employee, and ii) an amount of the shares of the at least one issuer that such employee has owned on the record date; transmitting, by the specifically programed processing computer system, to each employee of the plurality of employees, a Tender vote invitation to submit a Tender vote in the at least one Tender voting; where the Tender vote invitation includes at least the Tender control number encoded within the Tender vote invitation; receiving, by the specifically programed processing computer system, the Tender control number from a respective employee; in response to the receiving the Tender control number, generating, by the specifically programed processing computer system, a plurality of programmed visual computer screens to allow such respective employee to submit the Tender vote; where the plurality of programmed visual computer screens are configured to at least: i) show at least one entry choice based on a particular Tender voting type, ii) automatically calculate at least the following: a reminder of shares to be Tender voted based on a number of shares identified by such respective employee in a first entry choice; a total percentage of shares allocated by such respective employee during the Tender voting; iii) confirm such respective employee's Tender vote; iv) allow such respective employee to automatically change a previous Tender vote when such respective employee revises the previous Tender vote before the Tender deadline; recording, in real time, by the specifically programed processing computer system, a plurality of Tender votes of the plurality of employees as submitted Tender votes; and dynamically outputting, by the specifically programed processing computer system, at least one report identifying a progress of the at least one Tender voting.

In some embodiments, the at least one report can be based on at least one of the following criteria: i) a security name, ii)

a job number, iii) an election date, iv) an election time, v) a CUSIP, vi) at least one class, vii) an account number, viii) a number of shares, ix) a percentage tendered, x) a percentage not tendered, xi) Tendered shares, xii) the Tender control number, and xiii) election shares. In some embodiments, the at least one report can be based on at least one of the following: i) historical information regarding all instructions for every Tender control number; and ii) cumulative information regarding a final instruction for every Tender control number. In some embodiments, the plurality of programmed visual computer screens are further configured to at least: generate at least one error message when at least one submission of such respective employee for the at least one entry choice violates at least one pre-determine Tender rule, Tender calculation, or both. In some embodiments, the Tender vote invitation includes at least at least one URL encoded with the Tender control number. In some embodiments, the receiving the Tender control number from such respective employee further includes at least: receiving the Tender control number in response to an activation at least one URL encoded with the Tender control number by such respective employee. In some embodiments, the Tender vote invitation includes at least at least one visual presentation code encoded with the Tender control number.

In some embodiments, the instant invention provides a specifically programmed system that includes at least the following components: at least one programmed computer, having a non-transient computer tangible readable medium having stored thereon software instructions executable by at least one processor of the computer, where the software instructions include at least: code to receive an electronic Tender voting request to conduct at least one Tender voting; where the electronic Tender voting request identifies at least the following: i) at least one security of at least one issuer, and ii) a Tender deadline for the at least one Tender voting to submit Tender votes, iii) at least one condition of the at least one Tender voting; where the at least one Tender voting is limited to a plurality of employees who has owned shares of the at least one issuer at a record date via at least one of: i) at least one 401K plan, and ii) at least one employee stock ownership plan (ESOP); where the at least one Tender voting is selected from the group of Tender voting types consisting of: i) a Tender offer, ii) an All-or-None Tender offer, and iii) a Dutch Tender auction; based on the electronic Tender voting request, code to identify the plurality of employees who own the shares of the at least one issuer on the record date; code to generate a Tender control number for each employee of the plurality of employees; where the Tender control number includes at least at least one Tender tag; where the Tender control number is associated in data records with at least: i) such employee, and ii) an amount of the shares of the at least one issuer that such employee has owned on the record date; code to transmit, to each employee of the plurality of employees, a Tender vote invitation to submit a Tender vote in the at least one Tender voting; where the Tender vote invitation includes at least the Tender control number encoded within the Tender vote invitation; code to receive the Tender control number from a respective employee; in response to the receiving the Tender control number, code to generate a plurality of programmed visual computer screens to allow such respective employee to submit the Tender vote; where the plurality of programmed visual computer screens are configured to at least: i) show at least one entry choice based on a particular Tender voting type, ii) automatically calculate at least the following: a reminder of shares to be Tender voted based on a number of shares identified by such respective employee in a first entry choice; a total percentage of shares allocated by such respective employee during the Tender voting; iii) confirm such respective employee's Tender vote; iv) allow such respective employee to automatically change a previous Tender vote when such respective employee revises the previous Tender vote before the Tender deadline; code to record, in real time, a plurality of Tender votes of the plurality of employees as submitted Tender votes; and code to dynamically output at least one report identifying a progress of the at least one Tender voting.

BRIEF DESCRIPTION OF THE DRAWINGS

The present invention will be further explained with reference to the attached figures. The figures constitute a part of this specification and include illustrative embodiments of the present invention and illustrate various objects and features thereof. Specific functional details disclosed herein are not to be interpreted as limiting, but merely as a representative basis for teaching one skilled in the art to variously employ the present invention.

FIGS. 1-17 show screenshots that illustrates various aspects of some embodiments of the invention.

Figure 1:
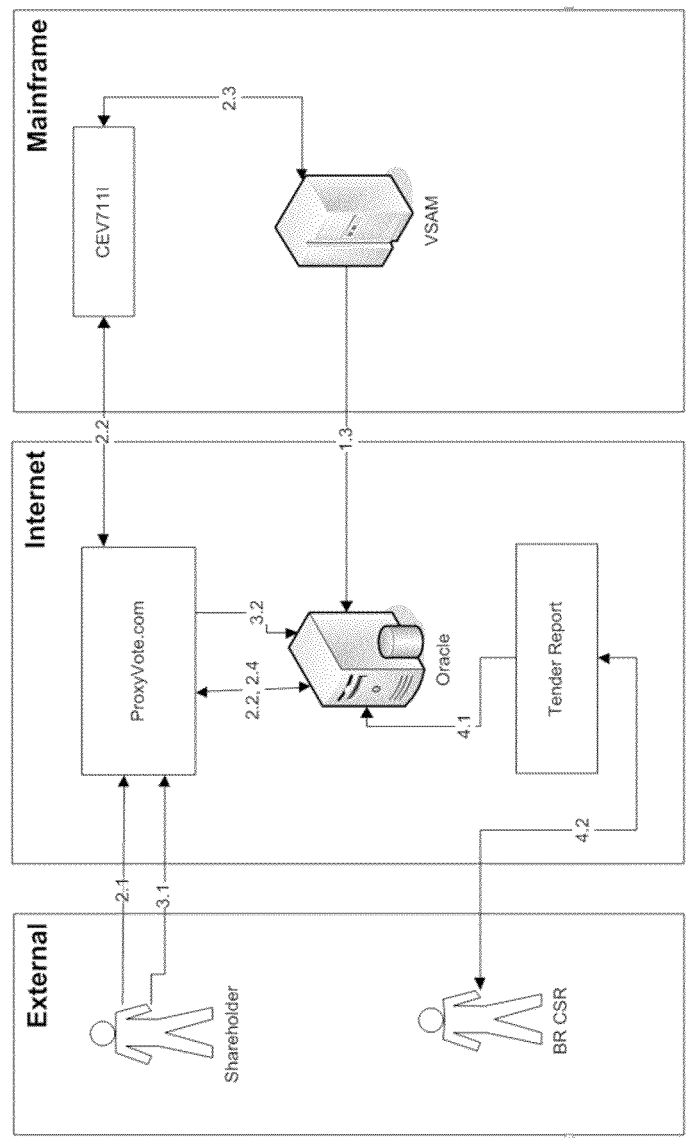

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

DETAILED DESCRIPTION

Among those benefits and improvements that have been disclosed, other objects and advantages of this invention can become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive. Any alterations and further modifications of the inventive feature illustrated herein, and any additional applications of the principles of the invention as illustrated herein, which can normally occur to one skilled in the relevant art and having possession of this disclosure, are to be considered within the scope of the invention.

Throughout the specification and claims, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

In some embodiments, the inventive systems of the instant invention facilitate the Election Process of a Corporate Action (C/A). In some embodiments, since there are many variation of C/As, in some embodiments, the inventive systems of the instant invention accommodate the issuer's requirement and/or the event. In some embodiments, the inventive systems of the instant invention can handle a variety of different event types with multiple election options.

For purposes of this description, in some embodiments, the term "record date" is directed to a date on which books of a issuer are closed during the process of identifying the owners for purposes of engaging them in one or more of corporate actions. For example, only the common stockholders who are listed on the record date will receive an invitation to vote.

In some embodiments, the inventive systems and computer methods of the instant invention facilitate at least one of the following corporate actions: Tender, All or None Tender, and/or Dutch Tender auction. In some embodiments, the inventive systems and computer methods of the instant invention can additionally facilitate corporate actions of an Election and/or Exchange. In some embodiments, the term "Exchange" is directed to one for one or, a ratio distribution of one company for another. In some embodiments, the term "Exchange/Acquisition Offer" is directed to an offer made by a corporation to exchange one issue of its securities for another, (e.g. equity shares for a debt issue). It could also be an attempt by one company to gain control of another company by obtaining a percentage of issued and outstanding shares. The acquiring company will offer shares of its own company in exchange for shares of the other firm.

In some embodiments, the inventive systems and computer methods of the instant invention can additionally facilitate corporate actions of Conversion. In some embodiments, the term "Conversion" is directed to the exchange of equity or debt for a different class of equity or debt. Conversion privileges generally have an expiration date after which the shareholder still retains ownership in the original security.

In some embodiments, the inventive systems and computer methods of the instant invention can additionally facilitate corporate actions of Redemption. In some embodiments, the term "Redemption" is directed to the liquidation of a debt issue on or before the maturity date. Typically, Redemptions may be called in part or in their entirety.

In some embodiments, the inventive systems of the instant invention will receive multiple files initial and subsequent refresh files that will update account holder positions. In some embodiments, the files will be categorized by separate plans (e.g., hourly, salary employees) and will be loaded to the job to different stock classes to distinguish one plan versus another.

In some embodiments, the inventive systems of the instant invention receive custom cards that will contain election options rather than voting proposals. In some embodiments, the inventive systems of the instant invention can utilize proposal classification codes that may include 033333-Tender Offer and/or 044444-Dutch Tender Offer. In some embodiments, for Dutch Tender, the tender proposal will not be coded. In some embodiments, the application will automatically insert this proposal at the end of the proposal list. In some embodiments, this is a calculated value and will not be captured. In some embodiments, it is used for display purposes only.

In some embodiments, shares subject to the corporate actions in accordance with some embodiments of the instant invention (e.g., Tender Offer, All or None Tender Offer, Dutch Tender Offer, etc.) can be owned by at least 50 of individual and/or entities (e.g., who are customers of financial-related entities such as banks, brokerages, etc.). In some embodiments, shares subject to the corporate actions in accordance with some embodiments of the instant invention (e.g., Tender Offer, All or None Tender Offer, Dutch Tender Offer, etc.) can be owned by at least 100 of individual and/or entities (e.g., who are customers of financial-related entities such as banks, brokerages, etc.). In some embodiments, shares subject to the corporate actions in accordance with some embodiments of the instant invention (e.g., Tender Offer, All or None Tender Offer, Dutch Tender Offer, etc.) can be owned by at least 1,000 of individual and/or entities (e.g., who are customers of financial-related entities such as banks, brokerages, etc.). In some embodiments, shares subject to the corporate actions in accordance with some embodiments of the instant invention (e.g., Tender Offer, All or None Tender Offer, Dutch Tender Offer, etc.) can be owned by at least 10,000 of individual and/or entities (e.g., who are customers of financial-related entities such as banks, brokerages, etc.). In some embodiments, shares subject to the corporate actions in accordance with some embodiments of the instant invention (e.g., Tender Offer, All or None Tender Offer, Dutch Tender Offer, etc.) can be owned by at least 100,000 of individual and/or entities (e.g., who are customers of financial-related entities such as banks, brokerages, etc.). In some embodiments, shares subject to the corporate actions in accordance with some embodiments of the instant invention (e.g., Tender Offer, All or None Tender Offer, Dutch Tender Offer, etc.) can be owned by at least 1,000,000 of individual and/or entities (e.g., who are customers of financial-related entities such as banks, brokerages, etc.).

In some embodiments, shares subject to the corporate actions in accordance with some embodiments of the instant invention (e.g., Tender Offer, All or None Tender Offer, Dutch Tender Offer, etc.) can be owned by at least 50 employees who own the shares through 401K and/or Employee Stock Ownership Plan(s) (ESOP(s)). In some embodiments, shares subject to the corporate actions in accordance with some embodiments of the instant invention (e.g., Tender Offer, All or None Tender Offer, Dutch Tender Offer, etc.) can be owned by at least 100 employees who own the shares through 401K and/or ESOP(s). In some embodiments, shares subject to the corporate actions in accordance with some embodiments of the instant invention (e.g., Tender Offer, All or None Tender Offer, Dutch Tender Offer, etc.) can be owned by at least 1,000 employees who own the shares through 401K and/or ESOP(s). In some embodiments, shares subject to the corporate actions in accordance with some embodiments of the instant invention (e.g., Tender Offer, All or None Tender Offer, Dutch Tender Offer, etc.) can be owned by at least 10,000 employees who own the shares through 401K and/or ESOP(s). In some embodiments, shares subject to the corporate actions in accordance with some embodiments of the instant invention (e.g., Tender Offer, All or None Tender Offer, Dutch Tender Offer, etc.) can be owned by at least 100,000 employees who own the shares through 401K and/or ESOP(s). In some embodiments, shares subject to the corporate actions in accordance with some embodiments of the instant invention (e.g., Tender Offer, All or None Tender Offer, Dutch Tender Offer, etc.) can be owned by at least 1,000,000 employees who own the shares through 401K and/or ESOP(s).

In some embodiments, there can be at least 100,000 shares subject to the corporate actions in accordance with some embodiments of the instant invention (e.g., Tender Offer, All or None Tender Offer, Dutch Tender Offer, etc.). In some embodiments, there can be at least 1,000,000 shares subject to the corporate actions in accordance with some embodiments of the instant invention (e.g., Tender Offer, All or None Tender Offer, Dutch Tender Offer, etc.). In some embodiments, there can be at least 10,000,000 shares subject to the corporate actions in accordance with some embodiments of the instant invention (e.g., Tender Offer, All or None Tender Offer, Dutch Tender Offer, etc.). In some embodiments, there can be at least 100,000,000 shares subject to the corporate actions in accordance with some embodiments of the instant invention (e.g., Tender Offer, All or None Tender Offer, Dutch Tender Offer, etc.).

In some embodiments, the inventive systems of the instant invention are specifically programmed for the tender offers and voting so that that they can be identified by the back end as Reorg (reorganization) options and the front end (a custom voting website such as ProxyVote.com). In some embodiments, the number of proposals will vary depending on one of the two event types 1) Tender and 2) Dutch auction tender.

In some embodiments, the cards will request that the shareholder make their election on the web or mail back the completed card. In some embodiments, the shareholder will be asked to select one box if they do not wish to tender or select a different box if they wish to tender. In some embodiments, if a shareholder selects the box that they wish to tender they will be asked to indicate on a line the percentage (%) of shares they wish to tender, this last step would be expanded for Dutch auction events, so that the shareholder can select a price from a set of pre determined prices listed on the card. In some embodiments, each price would have to be designated as another proposal on ProxyPlus. In either case the grand total of tender % and Not-Tender % should always equal to 100%.

In some embodiments, the inventive systems of the instant invention receive all of the shareholder elections via a customized "ProxyVote" website (e.g., via unique control number generated from mailing) that are either entered by the shareholder directly or by a scanning a paper card that the shareholder mails in. In some embodiments, the inventive systems of the instant invention, via a specifically programmed computer interface, capture all entered elections on a cumulative basis throughout the life of the tender offer until the designated Expiration Date (equivalent to cut off date). In some embodiments, the inventive systems of the instant invention provide a specifically programmed work bench tool that can be utilized to extract a report of all of the captured elections; this report can be sent to a recipient on a periodic basis (e.g., daily, etc.) via a secured site. In some embodiments, the inventive systems of the instant invention automatically generate the report of all of the captured elections based on one or more pre-determined criteria.

In some embodiments, the inventive systems of the instant invention electronically receives/obtains refresh files that include TIN numbers, and updated share quantities, which can be provided by at least one of: custodians of beneficial shareholders, issuers, and an entity who is not a custodian of beneficial shareholders or issuer. In some embodiments, the inventive systems of the instant invention allows to import the refresh files by data entries as account adjustments utilizing the 205 screen. In some embodiments, the inventive systems and methods of the instant invention utilize an "election" report allows to apply the elected percentage quantities to the updated positions.

In some embodiments, the inventive systems and methods of the instant invention address the security concerns as described below, but are not limited to.

Input Validation

In some embodiments, all input coming from various electronic sources (e.g., webpages, etc.) can be validated for length and format prior to use.

Output Encoding

In some embodiments, the inventive systems and methods of the instant invention can utilize encoding to encode any dynamic data being shown to an end user, using the ESAPI library or a similar suitable technique.

JSession Cookie Security

In some embodiments, the inventive systems and methods of the instant invention can utilize JSession cookie that is HTTPOnly and secure.

SQL Injection

In some embodiments, the inventive systems and methods of the instant invention can utilize stored procedures to access at least one database (e.g., Oracle database, MS SQL, etc.). In some embodiments, all parameters sent to the stored procedure will be properly escaped to prevent SQL Injection attacks.

Frame Busting Code

In some embodiments, the inventive systems and methods of the instant invention can utilize webpages that are never displayed within an iframe. In some embodiments, the X-Frame-Options header can be set to DENY and the inventive systems and methods of the instant invention can utilize JavaScript to make sure that the inventive tender offer webpage is the top frame.

Exception Handling

In some embodiments, the inventive systems and methods of the instant invention can handle all exceptions and errors from code that is specially programed so that no sensitive information being displayed to the user.

Directory Indexing

In some embodiments, the inventive systems and methods of the instant invention can disable a Directory Indexing feature for the JVM that is utilized to display information through a specifically programed user interface (e.g., a webpage)

Form Auto Completion

In some embodiments, the inventive systems and methods of the instant invention can utilize specifically programed web forms that have the autocomplete attribute set to "off."

FIG. 1 illustrates an illustrative flow diagram of an exemplary tender offer process in accordance with some embodiments of the instant invention. The exemplary tender offer process of FIG. 1 show the following components.

Data Feeds:

1.1—Mainframe Meeting and Agenda related information is loaded into VSAM/082 at the end of the night cycle.

1.2—Data is pulled from a Mainframe and sent down and loaded into Oracle.

1.3—24×7 data (control numbers) are sent down and loaded to Oracle nightly after the Print process runs.

Authentication:

2.1—Shareholder logs into ProxyVote.com with a Control Number.

2.2—Proxy Vote validates the control number check digit by passing it to Oracle Stored Procedure and on successful validation passes the Control Number to a Mainframe program to authenticate control number and retrieve associated information.

2.3—The Mainframe program references VSAM data store.

2.4—Agenda related information is pulled from Oracle database and displayed on the site (originated from 1.2).

Tender Your Shares:

3.1—Shareholder submits and confirms their tendering/not-tendering shares (i.e., Votes).

3.2—Each Vote is logged in Oracle with a status of indicator to identify as a Tender Shares and not proxy votes (i.e., votes for regular corporate events such as annual meeting).

Reconciliation:

4.1—Batch process that runs daily to compute the tendered/non-tendered share amounts in daily cumulative will generate tender files and sftp to a secure location.

4.2—a recipient (e.g., Broadridge CSR) can retrieve the file from secured location.

In some embodiments, the inventive systems and methods of the instant invention can utilize on-demand report generation, for example, through a programmed tool of an administrative program (e.g., Proxy Work Bench).

In some embodiments, an entry to the Tender election website will be via 12 digit control number. In some embodiments, if the control number is not found, an error message will be displayed to the user. In some embodiments, the error message may include:

Text: "You've entered an invalid control number. Please try again or contact your Plan Administrator".

In some embodiments, a VOTE TENDER programmed page (e.g., a webpage, mobile app page) includes at least the following.

1) a Tender election section

In some embodiments, the Tender election section includes at least one of the following.

A) In some embodiments, the tender election section will be based on a selection of a percentage of shares to tender. In some embodiments, any range of tender values is allowable from 0% to 100%.

B) In some embodiments, there will be a calculation window next to the a entry/box "Amount to Tender %" that will reflect the amount of shares not tendered. In some embodiments, this will be a display-only field and will automatically calculate based upon the difference between 100% and the amount in the "Shares to Tender" box. In one non-limiting example: Shares to Tender=50%, then Shares Not Tendered=50%.

C) In some embodiments, a submitted election of 0% will be recorded as a "Do Not Tender" election. In some embodiments, in this scenario the Shares not Tendered would reflect 100%. In some embodiments, if no value (null) is entered and submit, a message would be displayed such as:

Text: You have not selected an election %. Please select an election and resubmit.

In some embodiments, the webpage will contain instructional language to inform the shareholder how to vote all, part or none of their shares:

Text: You may enter the % that you wish to have tendered not greater than 100%. The remaining portion will reflect the % that will not be tendered In some embodiments, the inventive systems and methods of the instant invention can utilize a rule that a user may not tender greater that 100% of owned shares. In some embodiments, this can be controlled by, but is not limited to, using a screen editing, using a fixed scroll, and/or by setting 0 to 100%, not presenting a value greater than 100.

In some embodiments, rule that users will be allowed to re-vote their shares as many times as they wish, up to the cutoff date and time.

In some embodiments, the inventive systems and methods of the instant invention can utilize a rule that a last vote in before cutoff is the prevailing instruction. If the user attempts to vote past the cutoff, an error message will be displayed such as:

Text: "The deadline for this event has expired. Please contact your Plan Administrator"

In some embodiments, the inventive systems and methods of the instant invention can utilize a rule that shares tendered instructions in any percentage from 1% to 100% will be captured in the database as a "For" vote. In some embodiments, shares tendered at 0% (Do Not Tender) will be captured as an "Against Vote". In some embodiments, the inventive systems and methods of the instant invention can utilize the same scheme to reflect the Tender submission in a vote string.

In some embodiments, the Dutch tender screen will follow the same rules and requirements as above, but will present the user with multiple price points that they can divide their shares across. In some embodiments, shares spread across price points cannot exceed a total of 100% or shares. In some embodiments, if the aggregate across the price points adds up to greater than 100%, an error message will be displayed.

Text: The total % exceeds 100%. Please correct and resubmit.

In some embodiments, when the user has submit a tender election by pressing the 'SUBMIT' button on the Vote Tender Page, a pop up will be displayed providing the option to Confirm or Cancel the tender election. In some embodiments, a CONFIRM/CANCEL POP-UP includes:

Text: Please confirm If the shares to be tendered are correct. If they are not, cancel and re-enter the correct amount In some embodiments, this same confirmation screen will be used for Dutch and Domestic tender elections. In some embodiments, if the user selects Cancel from the pop-up, they will be taken back to the Tender Voting screen, which will have the previous values cleared and ready for a re-vote. In some embodiments, if the user selects Confirm from the pop-up, they will be directed back to the Vote Tender screen in Confirmation mode.

In some embodiments, a VOTE TENDER SCREEN—CONFIRMATION MODE can include:

after the users have selected to confirm their Tender election, they will be returned to the Vote Tender screen with the following modifications: the entry fields will be locked and reflective of the tender elections that were confirmed.

In some embodiments, there will be a confirmation message such as:

Text: You may print this page as your confirmation for your records

There will be instructions for how to revote if they need to such as:

Text: If the shares to be tendered are not correct please, re-enter the correct amount and resubmit you entry.

Figure 2:
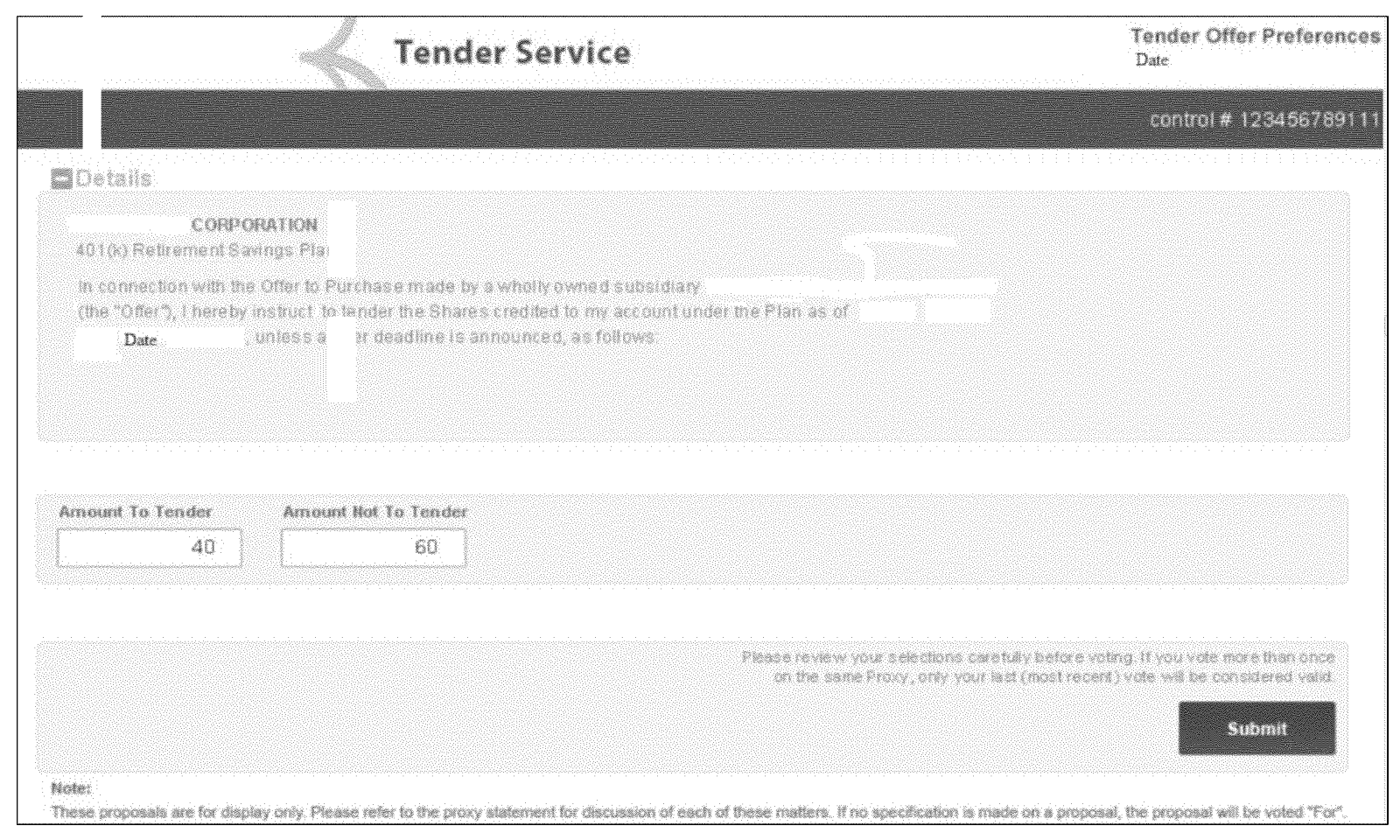

A non-limiting example of the Tender voting screen is shown in FIG. 2. In some embodiments, the new text input fields will only allow integers. In some embodiments, the action class/form data processing will make use of regular expressions to allow only integers. In some embodiments, the regular expression will be as follows:

^([01]?[0-9]?[0-9]|100)$

Figure 3:
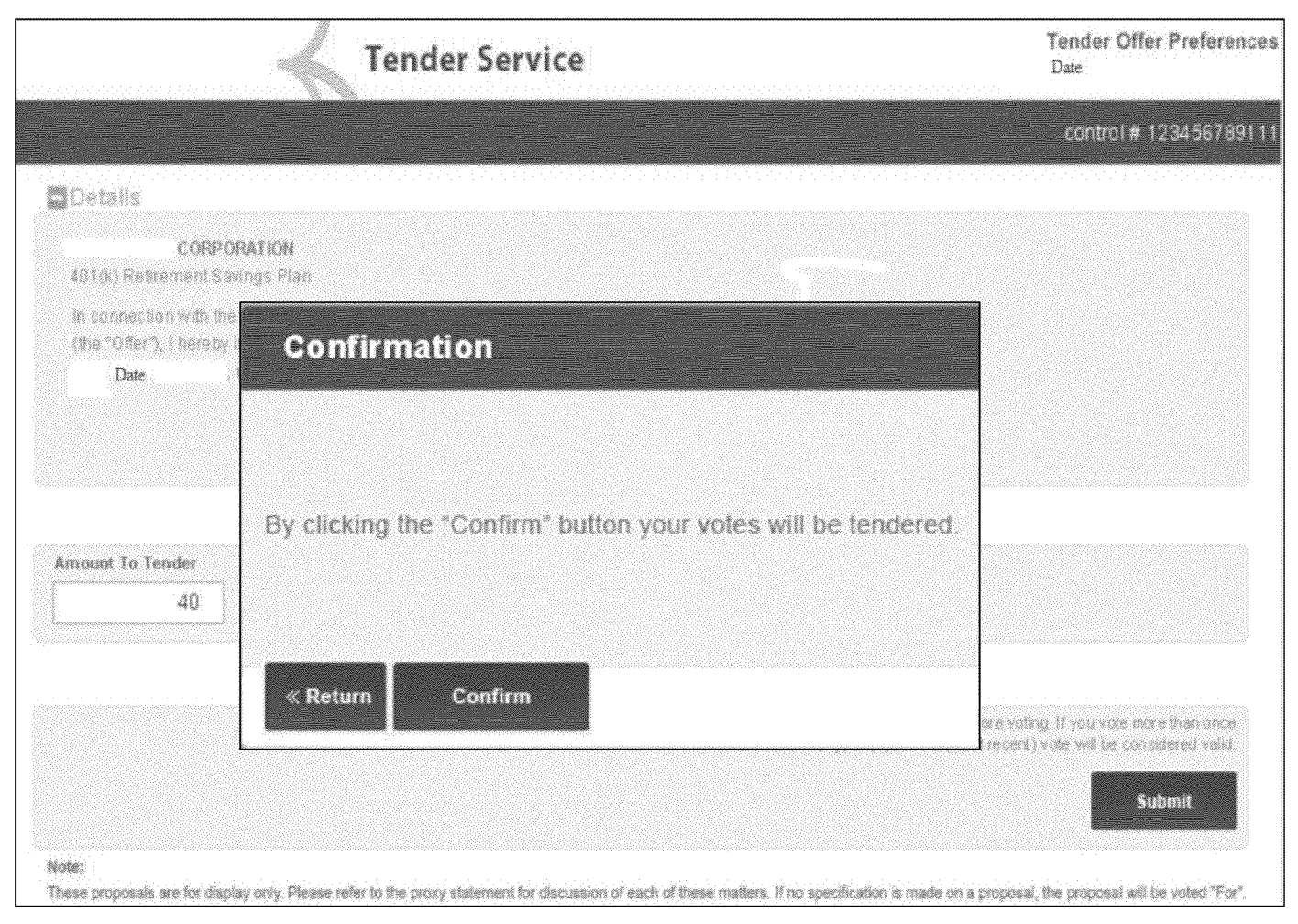

In some embodiments, the form fields will use both front-end and backend validation. For example, a non-limiting example of the Tender confirmation screen is shown in FIG. 3.

Figure 4:
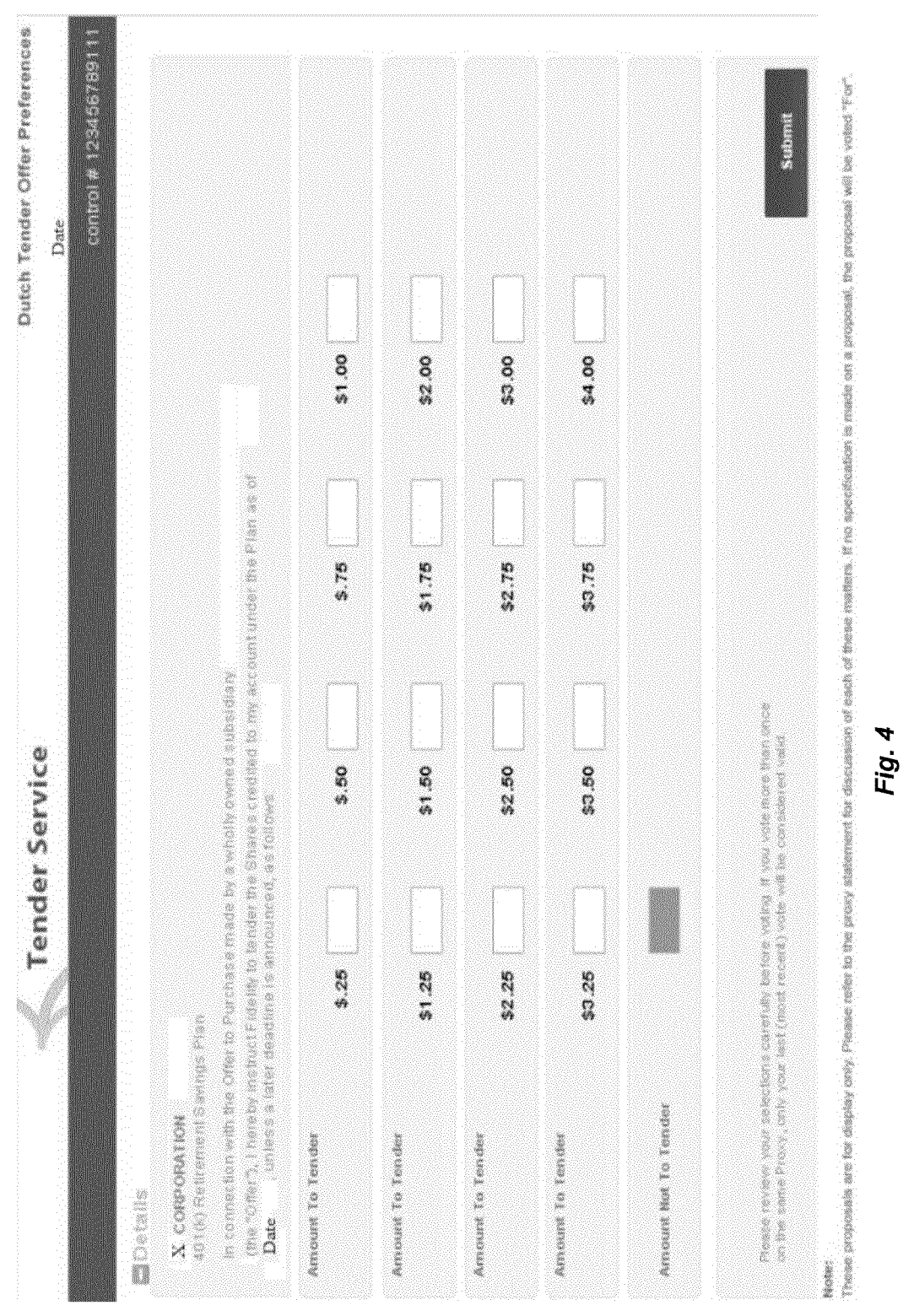
Figure 5:
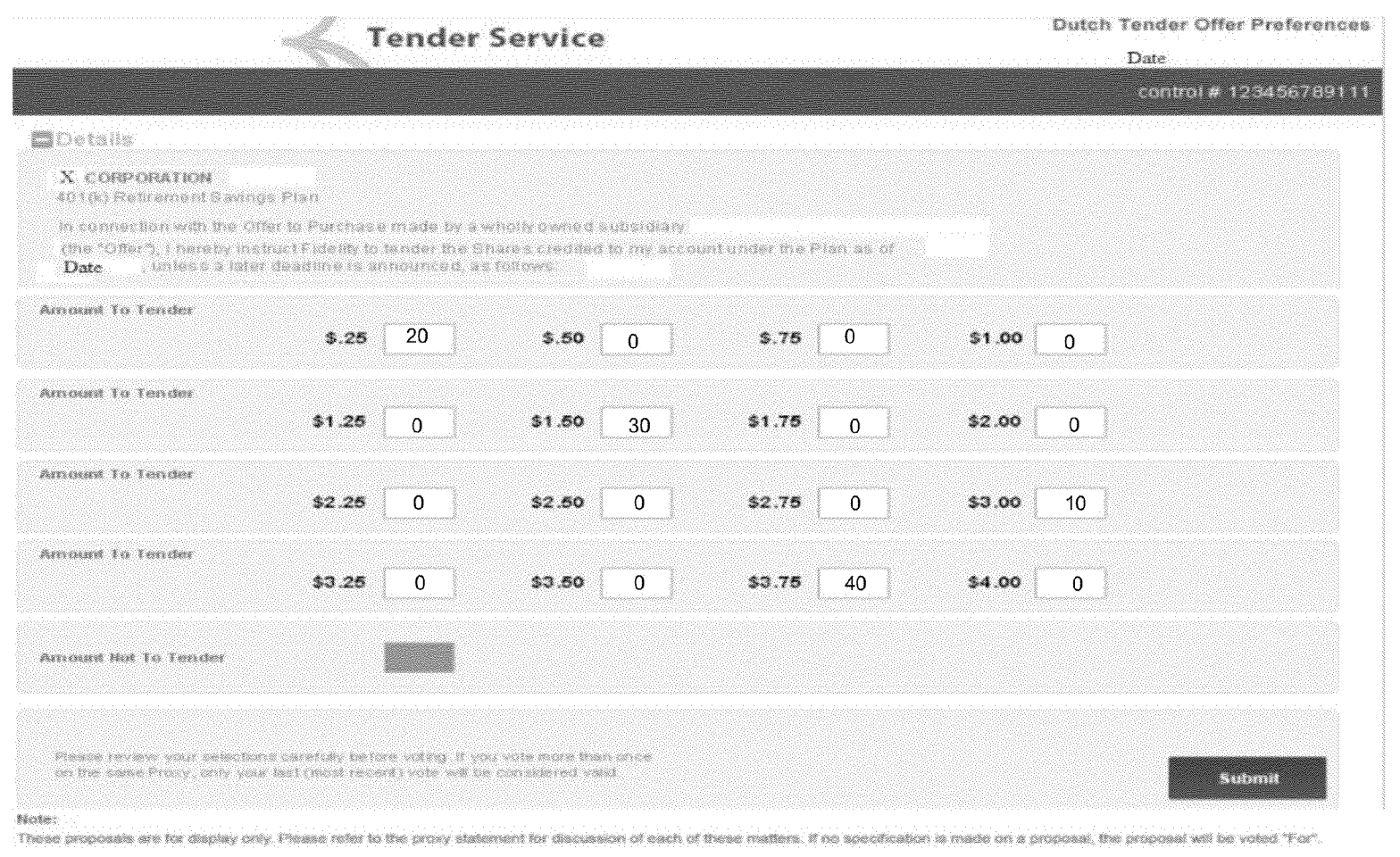
Figure 6:
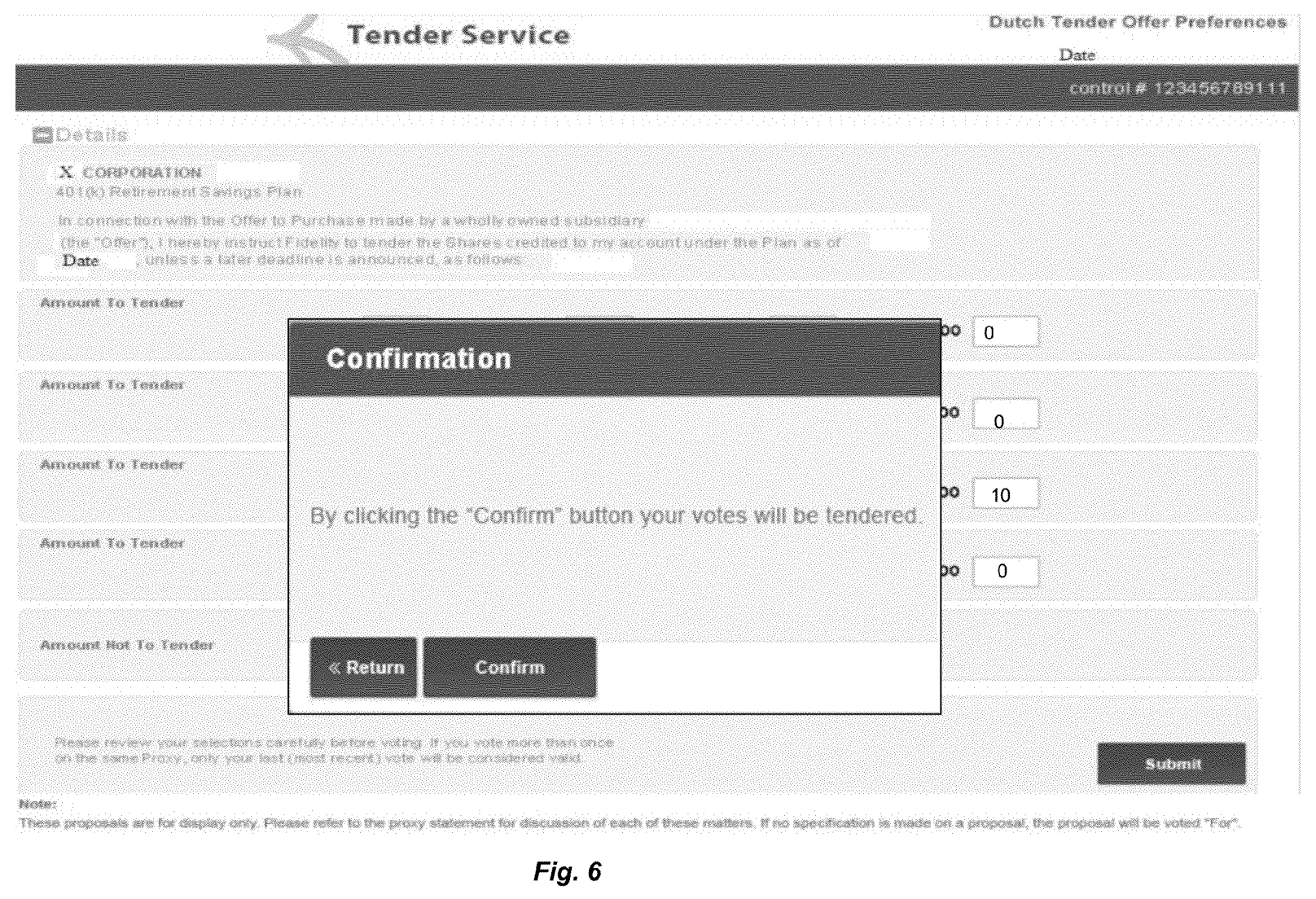

FIG. 4 illustrates a non-limiting example of the Dutch Tender screen in accordance with some embodiments of the instant invention. FIG. 5 illustrates a non-limiting example of the Dutch Tender vote submitted screen in accordance with some embodiments of the instant invention. FIG. 6 illustrates a non-limiting example of the Dutch Tender confirmation screen in accordance with some embodiments of the instant invention. In some embodiments, if the total percent of shares tenders is incorrect the following exemplary error message can be shown:

Text: Error: percentage totals must be equal to 100%. Please re-enter with proper amounts. Thank you.

In some embodiments, the inventive systems and methods of the instant invention can utilize a tool for setting up screens for tender submissions. In some embodiments, an illustrative example such set-up tool is referred to in the description as "ProxyWorkBench."

In some embodiments, the inventive systems and methods of the instant invention can utilize at least the following requirements/rules for ProxyWorkbench functions.

In some embodiments, since a corporation/business requires the ability to make the end of a Tender Election period a specific cutoff date and time, a MEETING ADMINISTRATION tab/functionality of theProxyWorkbench may include a field for the entry of a cutoff time. In some embodiments, the time will be formatted as HH:MM and will be updatable throughout the life of the meeting.

In some embodiments, the inventive systems and methods of the instant invention allows users (e.g., corporation, agents of corporations, etc.) to create reports on demand. In some embodiments, ad hoc reporting access will be available under a new tab in the ProxyWorkbench called "Tender Administration". In some embodiments, ad hoc reports will be pulled by a start and end date range and time range. In some embodiments, if no date range is specified (date fields are left blank), all historical information will be pulled. In some embodiments, report output will be on screen and downloadable into a CSV format (comma separated) output file. In some embodiments, this output should be saved locally by the user for e-mail to client via locally run encryption software (e.g., Symantec). In some embodiments, reports will also be run one time per day via a scheduled job (time to be provided by business). In some embodiments, these scheduled reports will be viewable/downloadable via the ProxyWorkbench. In some embodiments, the inventive systems and methods of the instant invention can utilize at least two types of scheduled reports:

Last Transaction—Only pulls most recent tender transaction per control #; and
  Historical—All tender elections performed against a control # historically.

In some embodiments, data fields to be pulled into an exemplary report are to include at least a plurality of the following fields:

Security Name
  Job Number
  Election Date
  Election Time
  CUSIP (a 9-character alphanumeric code which identifies a North American financial security)
  Class
  Account Number
  Number of Shares (total)
  Percentage Tendered
  Tendered Shares
  12 Digit Control Number
  Tender % @ <price point 1>
  Election Shares @ <price point 1>
  Tender % @ <price point 2>
  Election Shares @ <price point 2>
  Tender % @ <price point 3>
  Election Shares @ <price point 3>
  Tender % @ <price point 4>, and
  Election Shares @ <price point 4>.

In some embodiments, the votes that are captured for Tender Votes will require a new report. In some embodiments, the report will need to show all of the votes that were captured between a time frame. In some embodiments, date and time ranges will be used as input parameters for the reports. In some embodiments, the new report screen will reside in ProxyWorkBench under a new tab called TENDER ADMINISTRATION.

Figure 7:
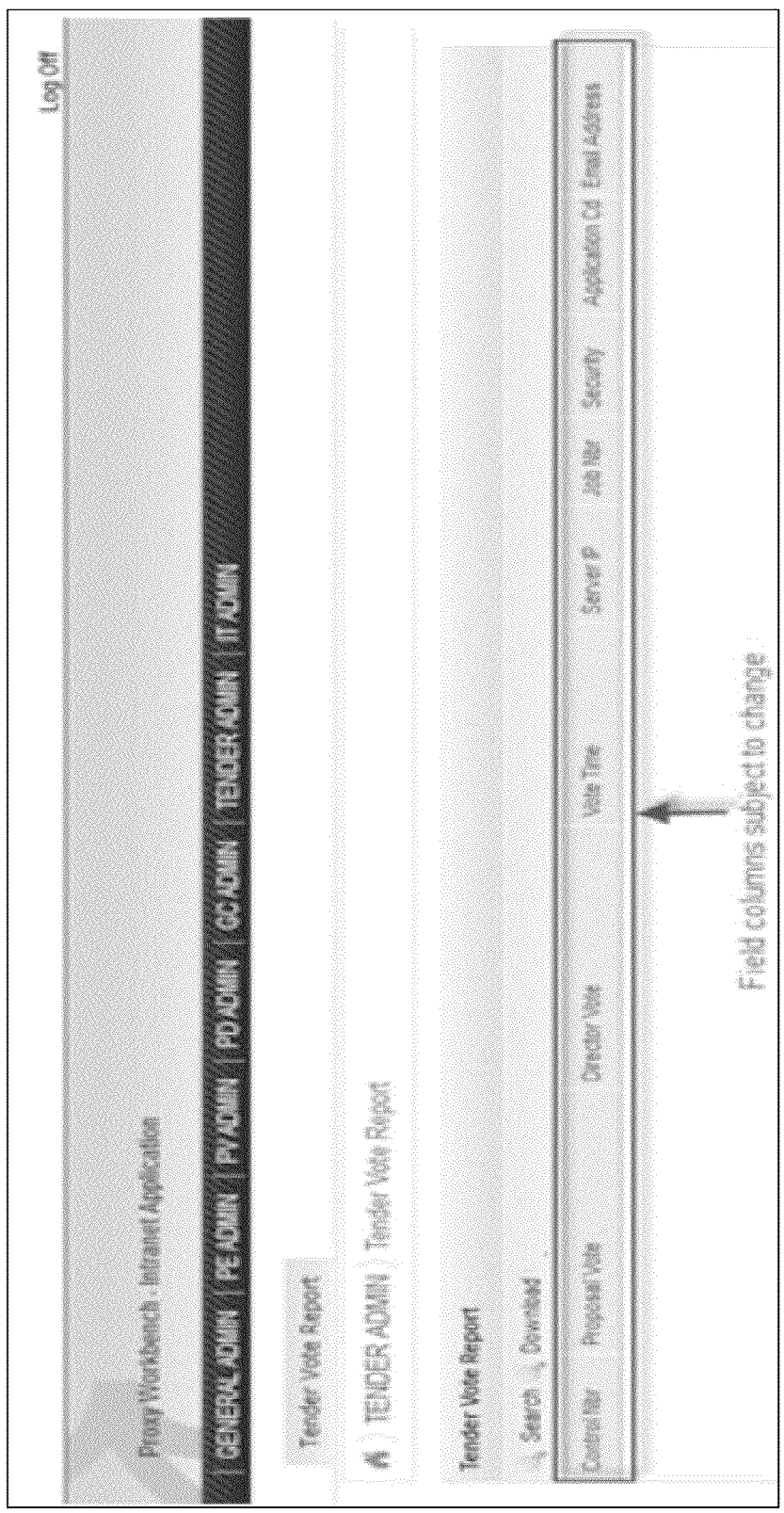
Figure 8:
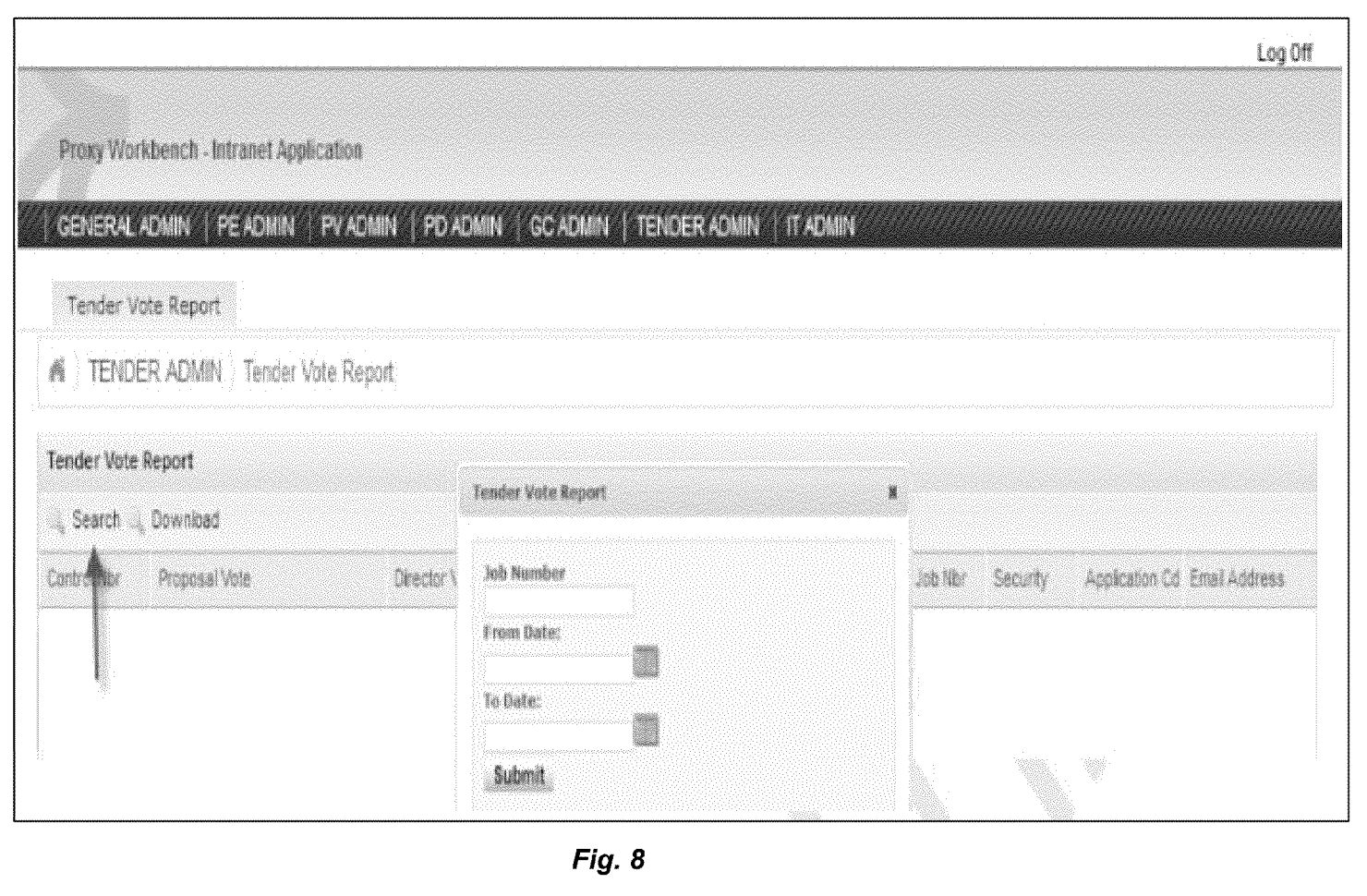
Figure 9:
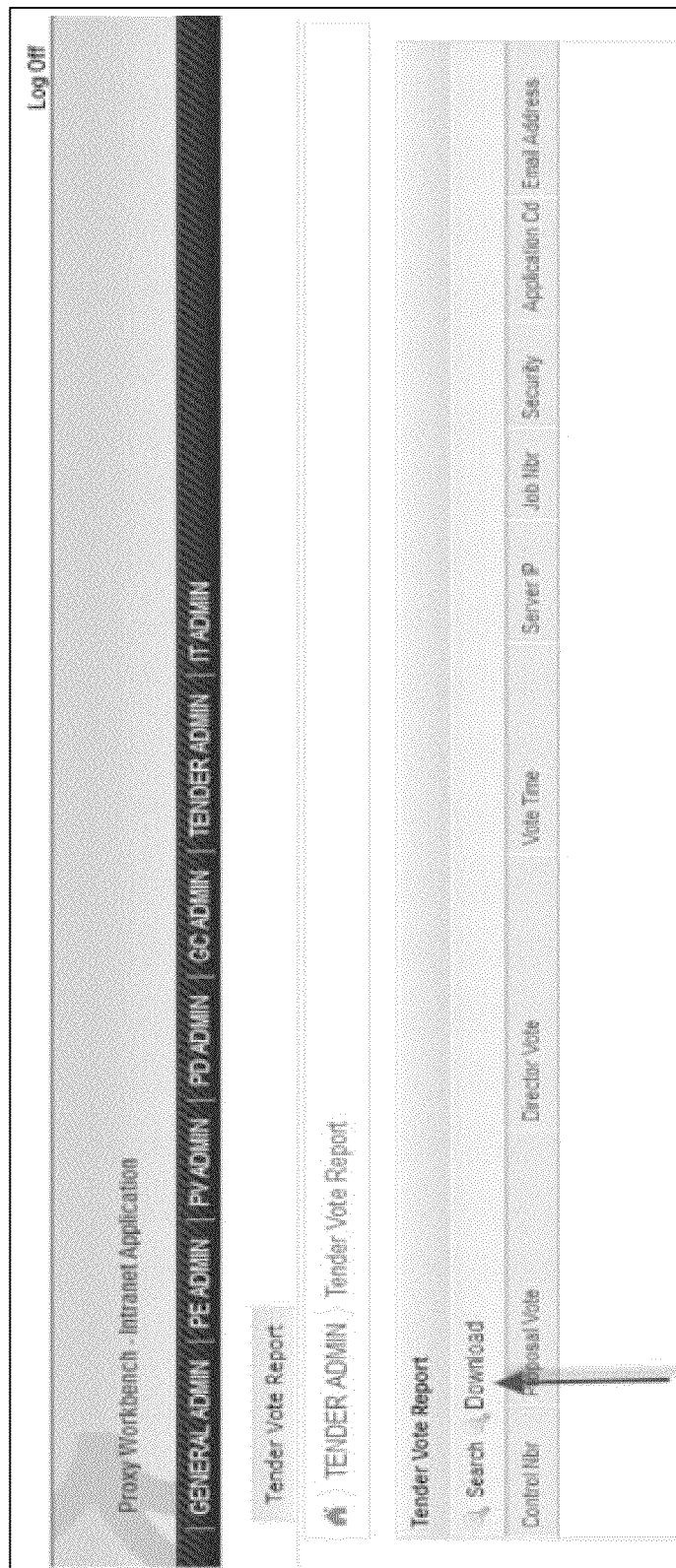

FIG. 7 illustrates a non-limiting example of a tender report webpage in accordance with some embodiments of the instant invention. In some embodiments, as shown in FIG. 8, an exemplary search screen in accordance with some embodiments of the instant invention will be a modal dialog box where the date range and job number will be entered. In some embodiments, as shown in FIG. 9, the end user will have the ability to download the csv report by clicking the download button.

Figure 10:
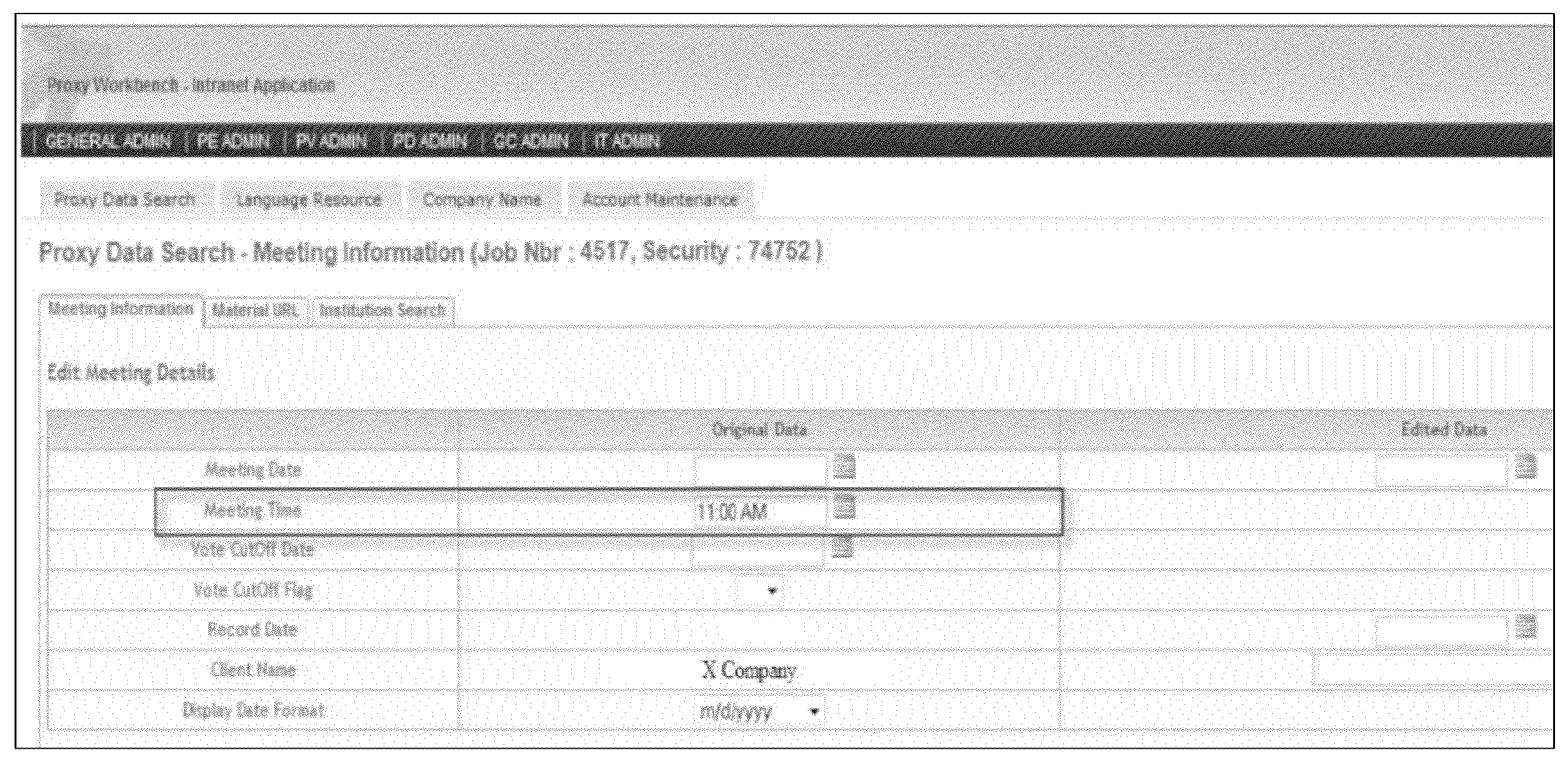

In some embodiments, since tender meetings are also time sensitive, and the inventive systems and methods of the instant invention can offer the ability to set a cutoff meeting time. In some embodiments, this will be accomplished by adding the meeting time to the existing meeting information screen in the ProxyWorkBench. In some embodiments, the screen will add one new field that will allow only a time component, as shown in FIG. 10.

In some embodiments, BUSINESS COMPONENTS may include a proxy voting web capabilities such as, but not limited to, ProxyVote.com. In some embodiments, proxy voting capabilities are used to allow voting on Tender and Dutch Tender Auctions. In some embodiments, a shareholder will come, for example, using an proxyvote URL and enter his/her control number to login. In some embodiments, the application will recognize the control number entered belongs to a Tender auction (e.g., rule logic based on the control number assignment, especial tag incorporated within the control number, etc.) and will redirect the shareholder to a new voting page for tender auctions. In some embodiments, if the shareholder has a PIN then the PIN page will be shown before they are brought to the new voting page.

In some embodiments, the flag that will signify if this control number belongs to a tender will come from the agenda result set when the meeting info is returned. In some embodiments, the new tender flag will be populated in a database (e.g., AgendaDTO).

In some embodiments, the flow of the application will be modified so when a control number is entered the system recognizes it and redirects to the appropriate page. In some embodiments, the tender vote web page can be a web form and have an assigned action class to handle the form. In some embodiments, the instant invention can utilize a configuration file that can be include code to accommodate the execution of the tender vote web page. For example, the code can include an exemplary function of:

com.broadridge.datamixer.form.TenderVoteForm extend PVForm, with class variables:
    String[ ] tenderForVote
    String[ ] tenderAgainstVote In some embodiments, the inventive systems and methods of the instant invention can utilize an action class that handle a vote action as follows:

com.company.datamixer.servlet.TenderVoteAction, using methods of:
Unspecified
validateRequest
agenda.

In some embodiments, the inventive systems and methods of the instant invention can utilize a helper class to capture and store the votes. In some embodiments, since tender auctions use percentages for votes, the inventive systems and methods of the instant invention can store the votes in vote_log and vote_log_split_detail tables. In some embodiments, the vote string will be a 'T' and will only reside in the proposal_vote_string column. In some embodiments, the director vote_string will not be used. In some embodiments, the vote_log_split_detail table will use only the for_shares and against_shares columns for voting.

In some embodiments, the inventive systems and methods of the instant invention can utilize a helper class to help the vote action, such as the following exemplary helper class:

```
com.company.datamixer.helper.TenderVoteHelper
ShareholderChoice buildTenderShares (
    HttpServletRequest request,
    UserDTO userDTO)
```

In some embodiments, the exemplary ShareholderChoice object can be instantiated from the ShareholderSplitShares object. In some embodiments, when storing the votes to a database, such as Oracle, a specifically programmed class method can be utilized, such as splitVoteCaptureUpdate.

In some embodiments, since the proposal vote string and pending status must be can be set differently from a process that obtains proxy votes by setting a pending status to null. In some embodiments, the inventive systems and methods of the instant invention can utilize a Tag (e.g., alpha-numerical—"T")) to identify the vote string for the tender votes.

In some embodiments, the inventive systems and methods of the instant invention can utilize a method and call a stored procedure that will be have at least one or more of the following parameters:
Timestamp fromDate
Timestamp toDate
Cursor
Sqlcode
sqlmssg.

In some embodiments, to add a meeting time functionality, the inventive systems and methods of the instant invention can include a field for general/meeting information, coded in, for example, Java server page to the ProxyWorkbench. In some embodiments, the inventive systems and methods of the instant invention can include coded functions to get and set the meeting time, such as:
Private String meetingTime;
Create getMeetingTime( )
Create setMeetingTime(String meetingTime).

In some embodiments, the inventive systems and methods of the instant invention can utilize a set of object classes in which the meeting Time is set from a front-end to a form object corresponding to a meeting information form. For example, inside a check for the ActionValue="editMeetingInfo" of the MeetingInfoAction class set the meetingTime method of the MeetingInfoForm from the front-end form capture. In some embodiments, the inventive systems and methods of the instant invention can utilize, for example, a specialized class object to pass the meetingTime parameter to a stored procedure inside a method is responsible for meeting updates.

In some embodiments, the inventive systems and methods of the instant invention pull data for a search, there is an update of the searchMeetingDetailsByAgenda method of the MeetingDAO class to get the new column meetingTime.

In some embodiments, the MeetingInfoHelper class will be modified to get the meetingTime column and store it into the MeetingDTO class inside the getMeetingInfo method.

In some embodiments, the inventive systems and methods of the instant invention can utilize a daily report to show the current days votes. In some embodiments, the inventive systems and methods of the instant invention can utilize a batch program. In some embodiments, the batch program will be, for example, kicked off each night via an automated process and will simply query the vot_log_split_detail table and tally up the votes for each day. In some embodiments, the inventive systems and methods of the instant invention can generate a text file on the server for ftp and/or email the report out. In some embodiments, the batch program can utilize a stored procedure usp_pwb_get_tender_vote_log programmed into the ProxyWorkbench.

In some embodiments, the inventive systems and methods of the instant invention can utilize a ProxyVote-Tender website to support 401K & ESOP Plan Administrators in capturing employee responses, on voluntary corporate action events such as Tenders/Dutch Auctions, to include any events with Book entry positions. In some embodiments, the inventive systems and methods of the instant invention can address/minimize one or more of the following concerns:
Risk and Liability
Ensure that the instructions within the time frame of the event
Expedite the reporting of the responses
Provide a real time reconciliation when the instructions are entered
Reduce mailing cost.

In some embodiments, the inventive systems and methods of the instant invention can utilize a letter of transmittal as a source document for a website instruction process, programmed in accordance with the instant invention. In some embodiments, the letter of transmittal can contain a name of the site's URL and directs the shareholder to enter their instructions on the site.

Figure 11:
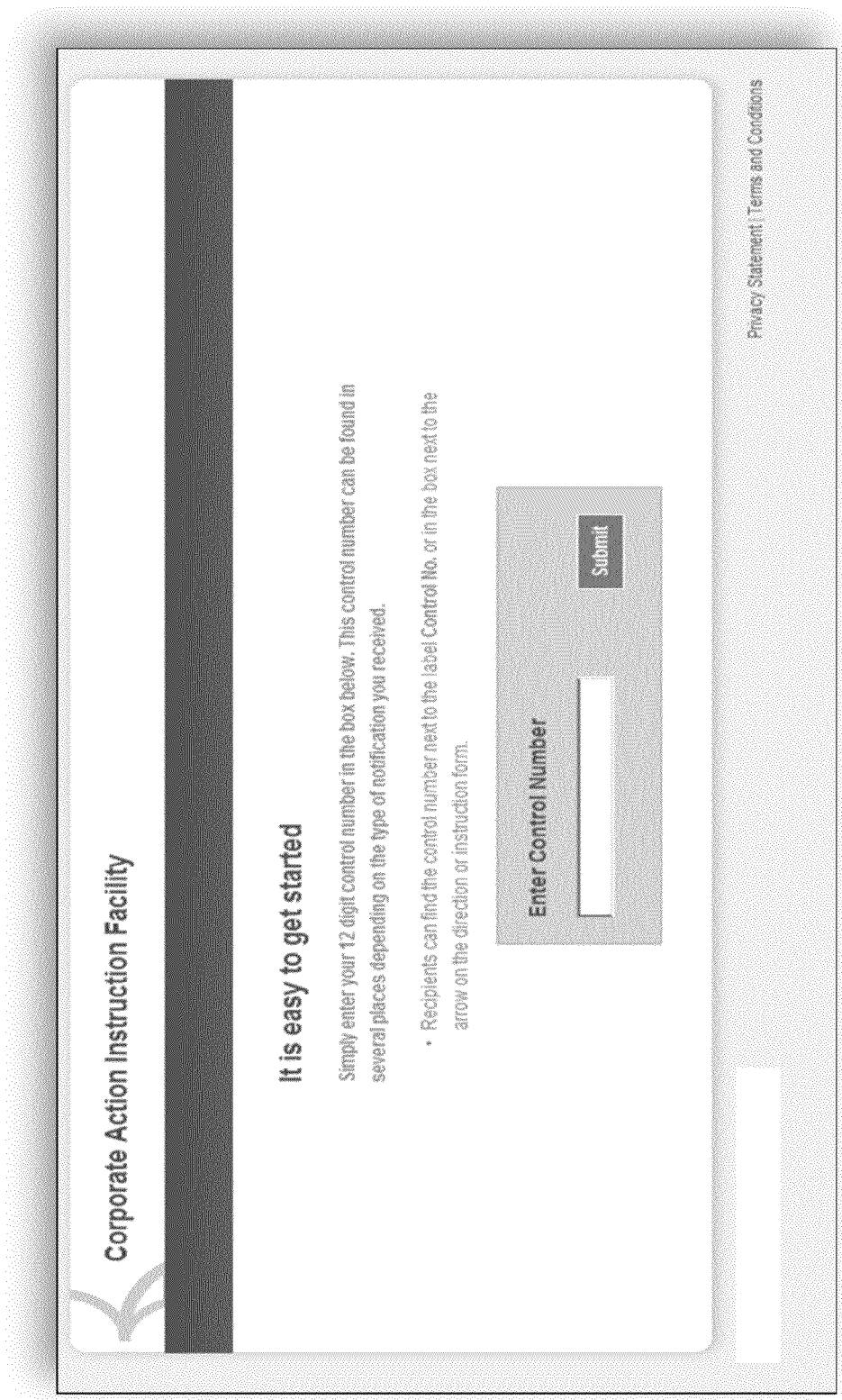

In some embodiments, a Tender application can be an intranet tool (e.g., Proxy Workbench) that is used to modify the site and pull down reports. In some embodiments, the shareholder enters a control number (e.g., a 12 digit control number) from the letter of transmittal form on a webpage, as, for example, shown FIG. 11. In some embodiments, if the number is encoded into a visual presentation code (e.g., QR code, RFID, NFC tag, etc.), the shareholder scans/photograph the visual code using, for example, its portable device to automatically submit the control number. In some embodiments, the Tender website can display a plurality of the following:
Current Time
Control Number
Issuer Description
Offer Type
Deadline date and time
Material links
Amount to be tendered box (In the Dutch auction version all of the eligible prices will be displayed)
Amount not to be tendered box
Submit button.

In some embodiments, the shareholder reads the hard copy materials received in the mail and/or can click on the links provided on the site. In some embodiments, once the shareholders are ready to make their election they enter the appropriate instructions on the site and click on the Submit button. In some embodiments, they can either print a confirmation of the transaction or enter additional control numbers if they have any.

In some embodiments, Shareholder will enter the percentage (%) amount of shares to be tendered. In some embodiments, once the percentage (%) amount of shares to be tendered is entered, a not-to-be-tendered box will automatically calculate and display the % of shares not tendered. In some embodiments, however if the % exceeds the 100%, an error message will display and block the holder from going forward.

In some embodiments, the inventive systems and methods of the instant invention can capture all of the information entered on the site into a database and accessed via a specifically designed application on (e.g., Proxy Workbench) in the form of at least two reports: a historical (all transactions for every control number) and/or cumulative (just the last transaction for the control number). In some embodiments, this application contains additional functionalities that allow, for example, to upload document links to the site, extend the shareholder expiration for the event, etc. In some embodiments, upon clicking the Submit button a confirmation window will be displayed as follows:

Click on the Confirm button to proceed
Click on the Cancel button to Cancel the Instruction.

In some embodiments, upon clicking the "Confirm" button, the responses are captured and displayed.

In some embodiments, the shareholder can also re-enter instructions if the original instructions were incorrect:
1. Click on the "CLICK HERE" link to re-enter instructions if the original instructions were incorrect or
2. Click on the "Print button" to print a confirmation of the transaction,
3. Click on the "New Control Number" if they wish to instruct on another item.

In some embodiments, the shareholder can look to fully automate the notification and the re-print function, as well as adding functionality that can change the text and terms displayed on the site. In some embodiments, the shareholder can track additional Corporate Action like Transferable and non-Transferable Rights offering or any other offering whereby the shares are held in book entry form. In some embodiments, the inventive systems and methods of the instant invention can utilize for any issuer whose shareholders participate in 401K plan that may be impacted by a C/A or any issuer with book entry share positions.

In some embodiments, the inventive systems and methods of the instant invention can utilize a website that is used to capture shareholder responses (instructions) for 401K & Employee Stock Ownership Plan ("ESOP") "registered" voluntary corporate action events such as Tenders and/or Dutch auction tenders (e.g., Tender Offer, Dutch Auction Tender, All or None Tender, etc.).

Figure 12:
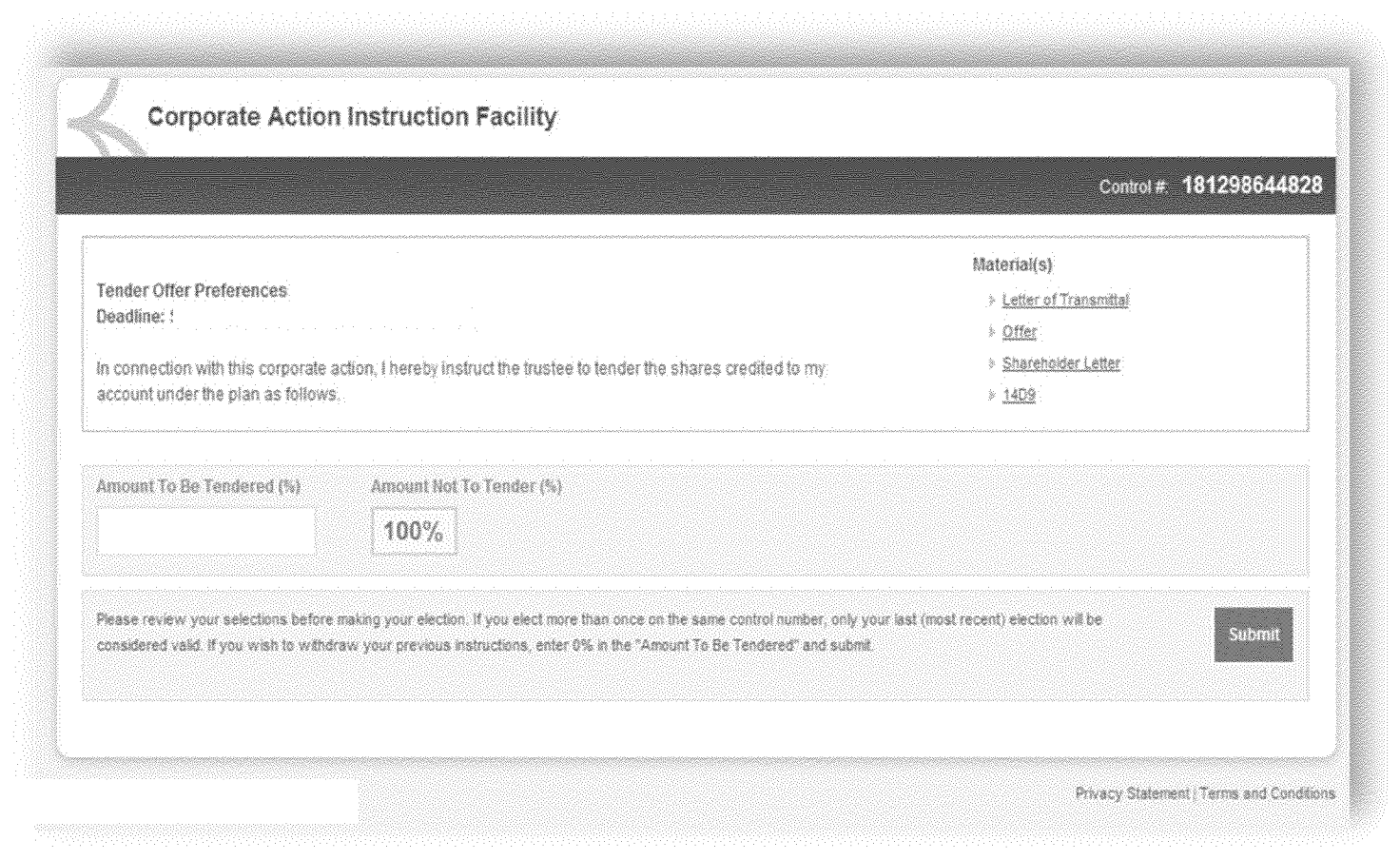

FIG. 12 illustrates a screenshot of an exemplary instruction page in accordance with some embodiments of the instant invention. In some embodiments, the an exemplary instruction page can display a plurality of the following:
Current Time
Control Number
Issuer Description
Offer Type
Deadline date and time
Material links
Amount to be tendered box (In the Dutch auction version all of the eligible prices will be displayed)
Amount not to be tendered box
Submit button.

Figure 13:
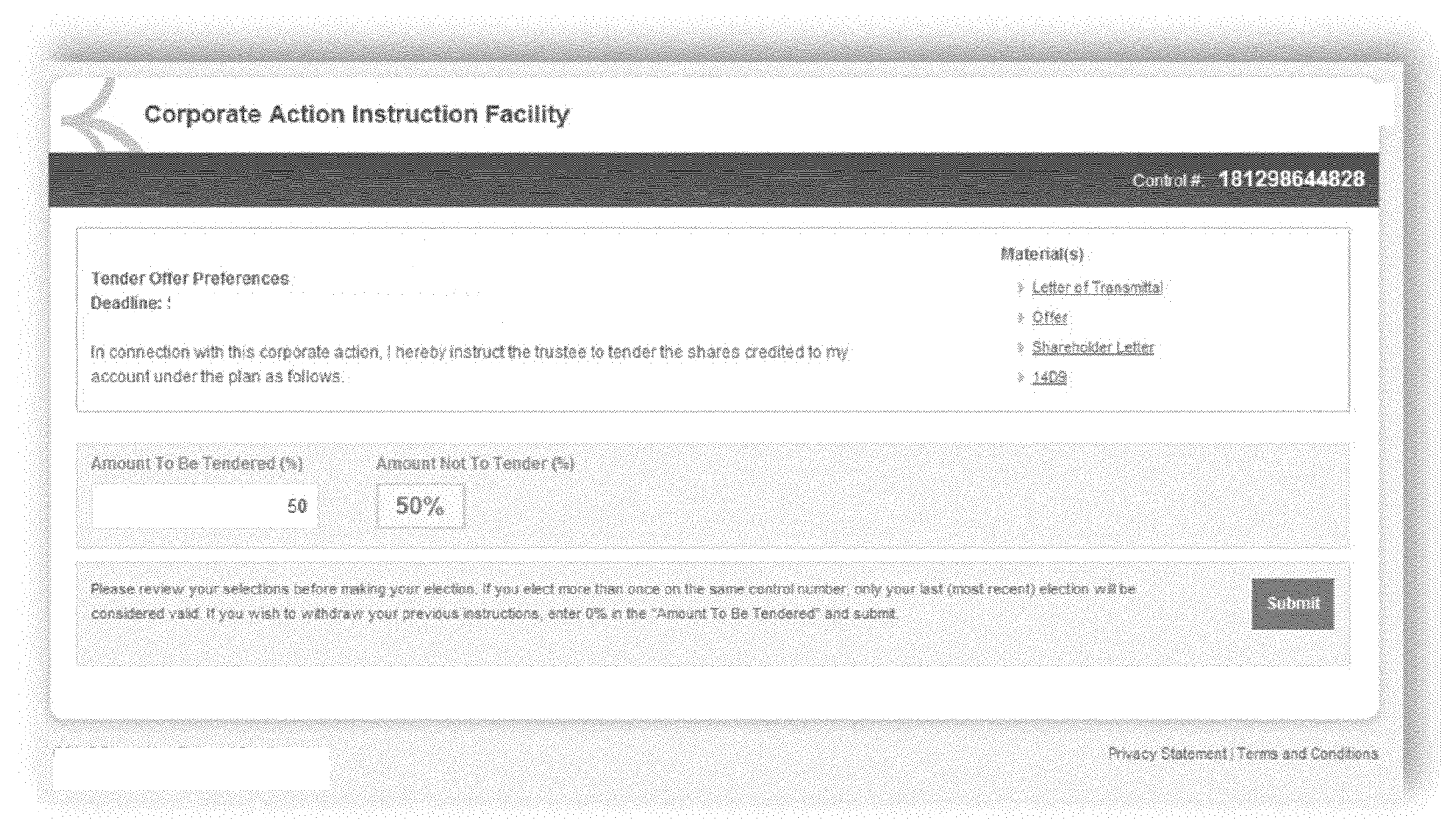

FIG. 13 illustrates a screenshot of an exemplary instruction page in accordance with some embodiments of the instant invention where shareholder entered an amount of shares tendered and the percentage of shares not tendered is automatically calculated.

Figure 14:
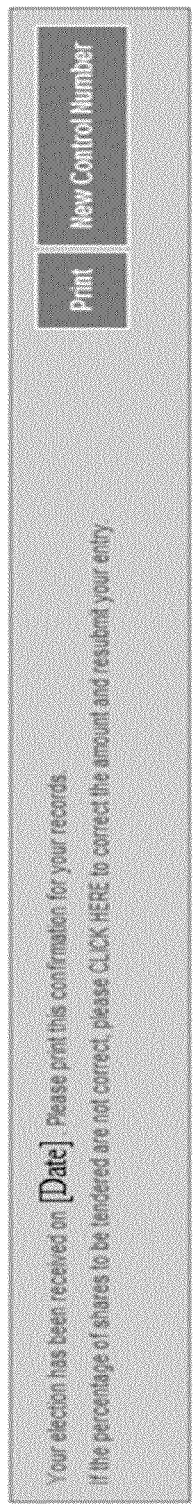

In some embodiments, upon clicking the Submit button a confirmation pop-up window will display:
a. Click on the Confirm button to proceed
b. Click on the Cancel button to Cancel the Instruction In some embodiments, upon clicking the Confirm button, the instructions are captured and displayed. In some embodiments, there is a confirmation generated in the form shown by an exemplary screenshot of FIG. 14. In some embodiments, after the confirmation, the shareholder can do, for example, one of the following:
a. Click on the "CLICK HERE" link to re-enter instructions if the original instructions were incorrect or
b. Click on the Print button to print a confirmation of the transaction
c. Click on the new control Number if they wish to instruct on another item.

In some embodiments, the exemplary tool of the instant invention, ProxyWorkBench, can be used to:
Establish the Reply Deadline Time
Extend the Reply Deadline
Upload Mailing Documents
Generate Client Reports.

Figure 15:
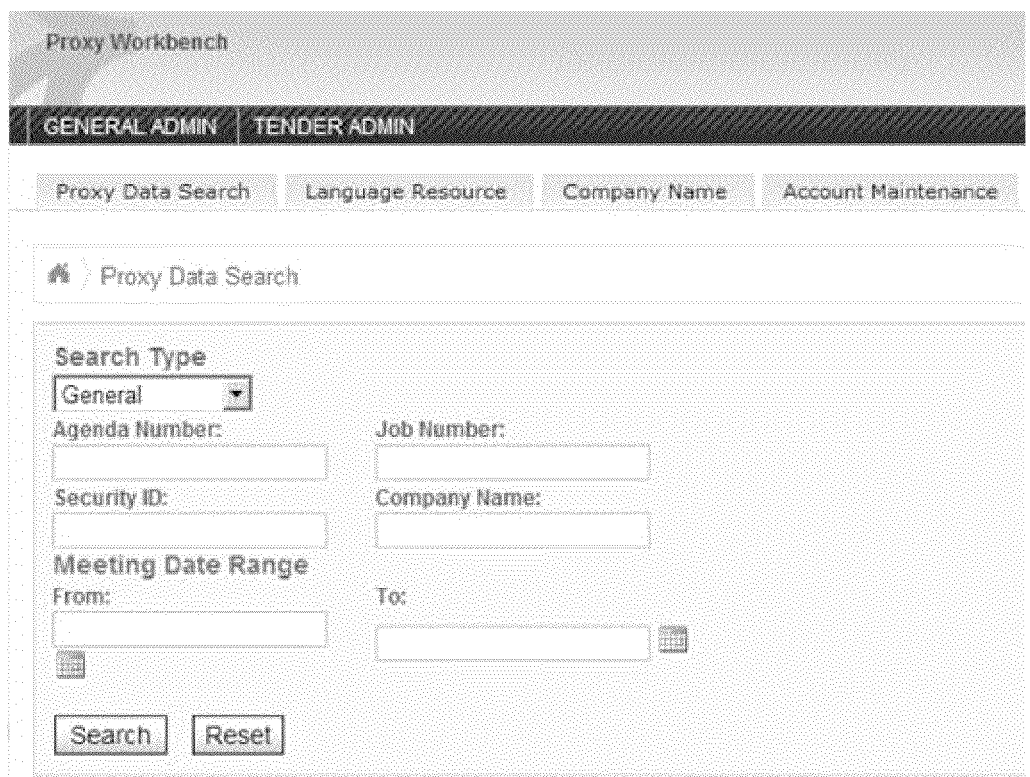

FIG. 15 illustrates a screenshot of an exemplary General Admin Tab of the tool ProxyWorkBench page with the "Tender Admin" tab in accordance with some embodiments of the instant invention which can be used for:
Establish the Reply Deadline Time
Extend the Reply Deadline
Upload Mailing Documents.

In some embodiments, a user can use the "Tender Admin" tab to establish the reply deadline time:
Type in the job number
Click on the search button
Then click on the job number link.

Figure 16:
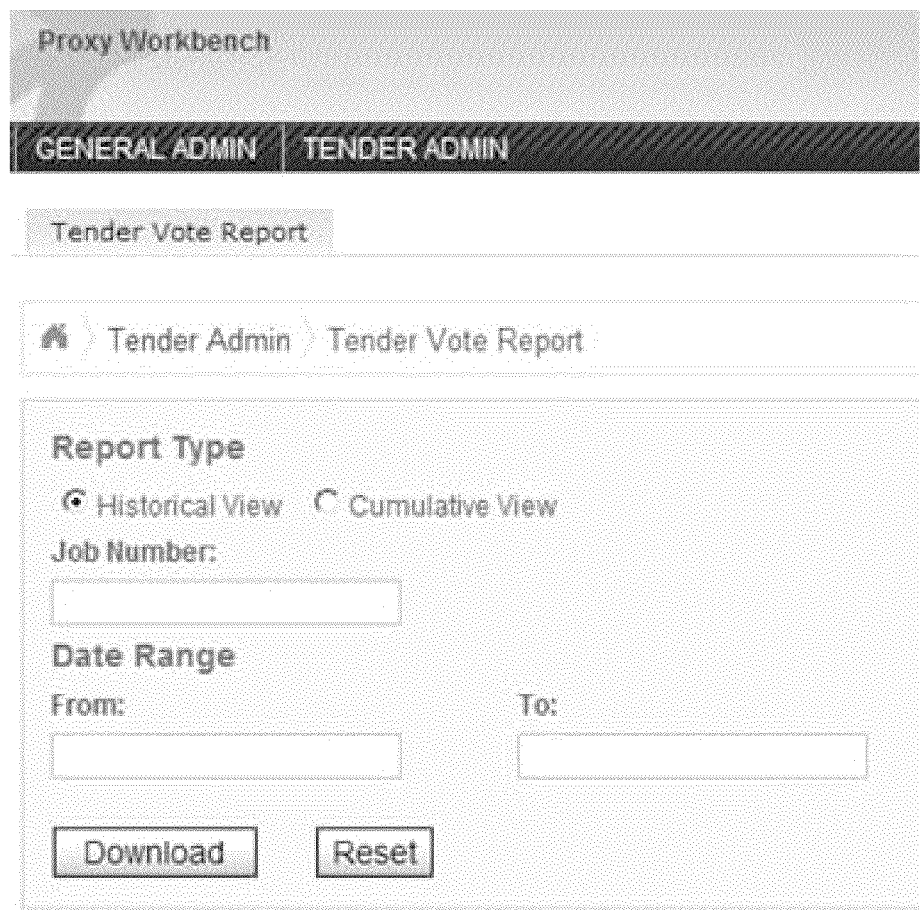

As shown in FIG. 10, in some embodiments, the user can enter the reply time deadline in the meeting time box. In some embodiments, the user can also update the reply deadline date if the offer is extended by entering the new replay deadline date in the meeting date box. In some embodiments, the inventive systems and methods of the instant invention electronically receives (e.g., via upload, etc.) documents. In some embodiments, the Tender Admin Tab of FIG. 15 can be selected to, for example, generate one or more of the following reports, as shown in FIG. 16:
Historical—All instructions for every control number
Cumulative—Just the final instruction for every control number.

In some embodiments, the Tender Admin Tab is used for:
Select the report type and then type the Job number in the Job number box
Select the date range, if left blank, the default will be all instructions for the job
Download/transmit report(s) in any suitable computer format (e.g., exl, csv, etc.).

In some embodiments, as illustrated in FIG. 17 by a screenshot of an exemplary retort, the inventive systems and methods of the instant invention allow users to design reports that can include information for a plurality of the following criteria:

Security Name
Job Number
Election date
Election time
CUSIP
Class
Account Number
Number of shares
Percentage tendered
Percentage not tendered
Tendered shares
Control Number
Percentage tendered, and
Election shares.

Illustrative Operating Environments for Some Embodiments

Figure 18:
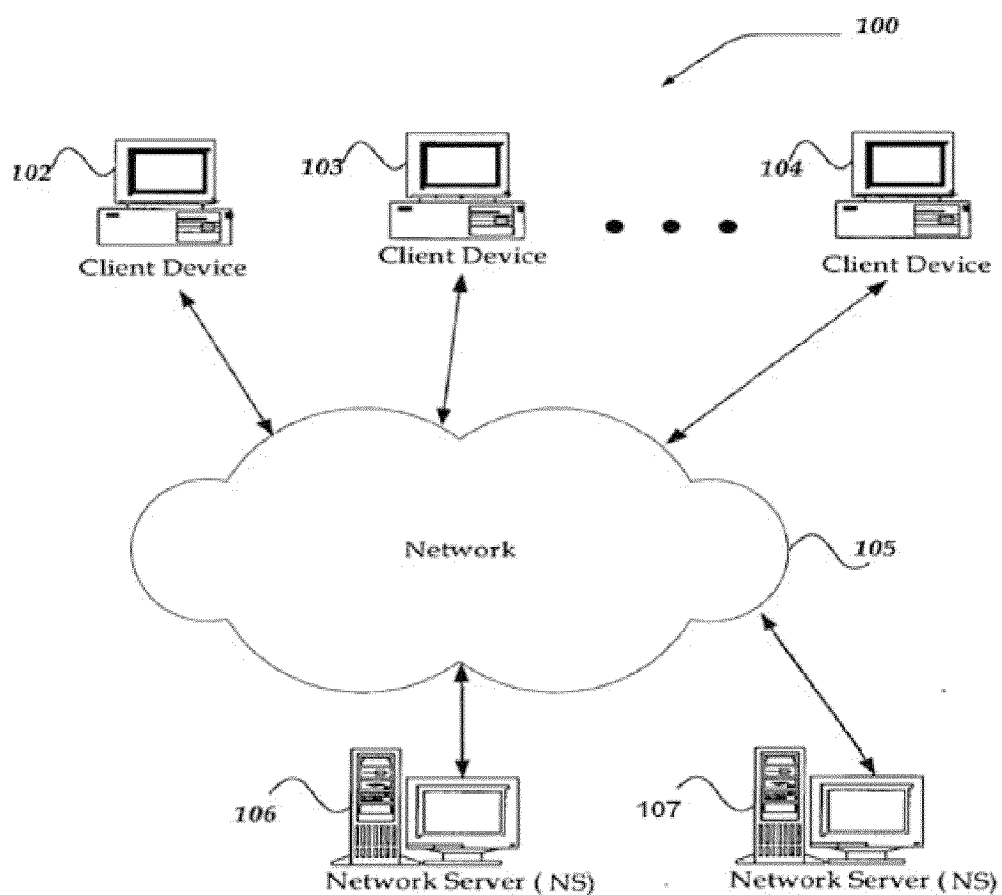
FIGS. 18-21 illustrate schematics of exemplary computer systems in accordance with some embodiments of the invention.

FIG. 18 illustrates a computer system in accordance with some embodiments of the present invention. However, not all of these components may be required to practice the invention, and variations in the arrangement and type of the components may be made without departing from the spirit or scope of the invention. In some embodiment, the inventive exchange system processes information related to a large number of shareholders (e.g., at least 10,000; at least 100,000; at least 1,000,000, etc.) and concurrent transactions (e.g., at least 10,000; at least 100,000; at least 1,000,000, etc.). In other embodiments, the inventive exchange computer system is based on a scalable computer and network architecture that incorporates varies strategies for assessing the data, caching, searching, and database connection pooling. An example of the scalable architecture is an architecture that is capable of operating multiple servers. In some embodiments, the computing system in accordance with the instant invention may include, but not limiting to, one or more programmed computers, systems employing distributed networking, or other type of system that might be used to transmit and process electronic data.

In some embodiments, client devices (e.g., computers, mobile device, etc.) 102-104 of, for example, custodians of financial information (e.g., banks, brokerages, etc.) and/or shareholders include virtually any computing device capable of receiving and sending a message over a network, such as network 105, to and from another computing device, such as servers (e.g., the inventive systems) 106 and 107, each other, and the like. In some embodiments, the set of such devices includes devices that typically connect using a wired communications medium such as personal computers, multiprocessor systems, microprocessor-based or programmable consumer electronics, network PCs, and the like. In some embodiments, the set of such devices also includes devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, In some embodiments, client devices 102-104 are any device that is capable of connecting using a wired or wireless communication medium such as a PDA, POCKET PC, wearable computer, and any other device that is equipped to communicate over a wired and/or wireless communication medium.

In some embodiments, client devices 102-104 are further configured to receive a message from the another computing device employing another mechanism, including, but not limited to, email, Short Message Service (SMS), Multimedia Message Service (MMS), instant messaging (IM), internet relay chat (IRC), mIRC, Jabber, and the like.

In some embodiments, network 105 is configured to couple one computing device to another computing device to enable them to communicate. In some embodiments, network 105 is enabled to employ any form of computer readable media for communicating information from one electronic device to another. Also, In some embodiments, network 105 includes a wireless interface, and/or a wired interface, such as the Internet, in addition to local area networks (LANs), wide area networks (WANs), direct connections, such as through a universal serial bus (USB) port, other forms of computer-readable media, or any combination thereof. In some embodiments, on an interconnected set of LANs, including those based on differing architectures and protocols, a router acts as a link between LANs, enabling messages to be sent from one to another.

Also, in some embodiments, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, In some embodiments, remote computers and other related electronic devices could be remotely connected to either LANs or WANs via a modem and temporary telephone link. In essence, In some embodiments, network 105 includes any communication method by which information may travel between client devices 102-104, and servers 106 and 107.

Figure 19:
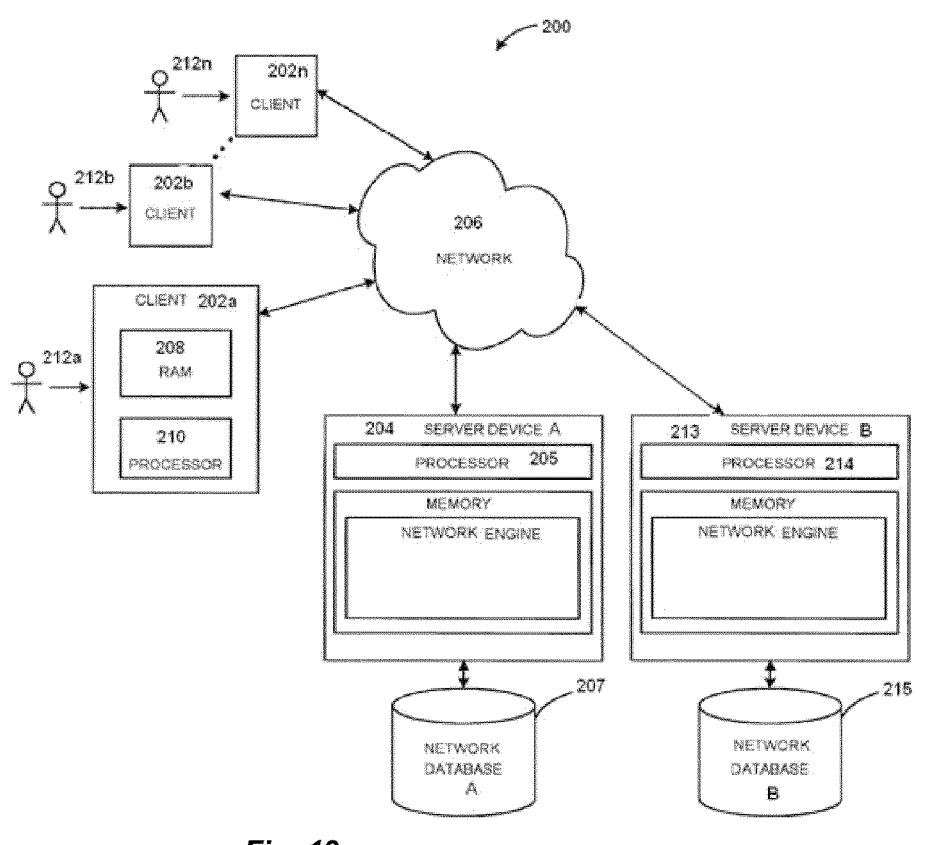

FIG. 19 shows another exemplary embodiment of the systems computer and network architecture that supports a computer systems system in accordance with some embodiments of the instant invention. The client devices of custodians of financial information (banks, brokerages, etc.) and/or shareholders 202a, 202b thru 202n (e.g., computers, mobile device, smart routers, etc.) shown each comprises a computer-readable medium, such as a random access memory (RAM) 208 coupled to a processor 210. The processor 210 executes computer-executable program instructions stored in memory 208. Such processors comprise a microprocessor, an ASIC, and state machines. Such processors comprise, or are be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 210 of client 202a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media transmit or carry instructions to a computer, including a router, private or public network, or other transmission device or channel, both wired and wireless. The instructions comprise code from any computer-programming language, including, for example, C, C++, C#, Visual Basic, Java, Python, Perl, and JavaScript.

Client devices 202a-n also comprise a number of external or internal devices such as a mouse, a CD-ROM, DVD, a keyboard, a display, or other input or output devices. Examples of client devices 202a-n are personal computers, digital assistants, personal digital assistants, cellular phones, mobile phones, smart phones, pagers, digital tablets, laptop computers, Internet appliances, and other processor-based devices. In general, a client device 202a is any type of processor-based platform that is connected to a network 206 and that interacts with one or more application programs. Client devices 202a-n operate on any operating system capable of supporting a browser or browser-enabled application, such as Microsoft™, Windows™, or Linux. The client devices 202a-n shown include, for example, personal computers executing a browser application program such as Microsoft Corporation's Internet Explorer™, Apple Computer, Inc.'s Safari™, Mozilla Firefox, and Opera.

Through the client devices 202a-n, users/investors/employees/shareholders 212a-n can communicate over the network 206 with the inventive systems of the instant invention, each other and with other systems and devices coupled to the network 206. As shown in FIG. 2, server devices 204 and 213 (e.g., for the inventive systems) are also coupled to the network 206.

Figure 20:
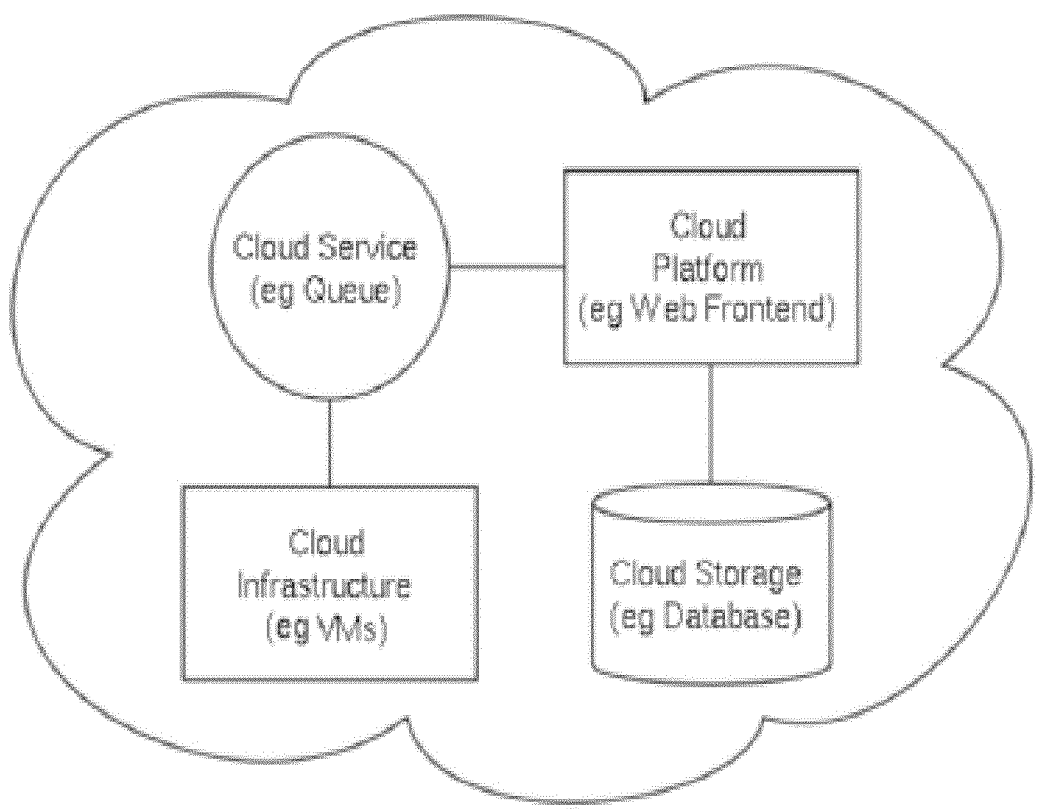
Figure 21:
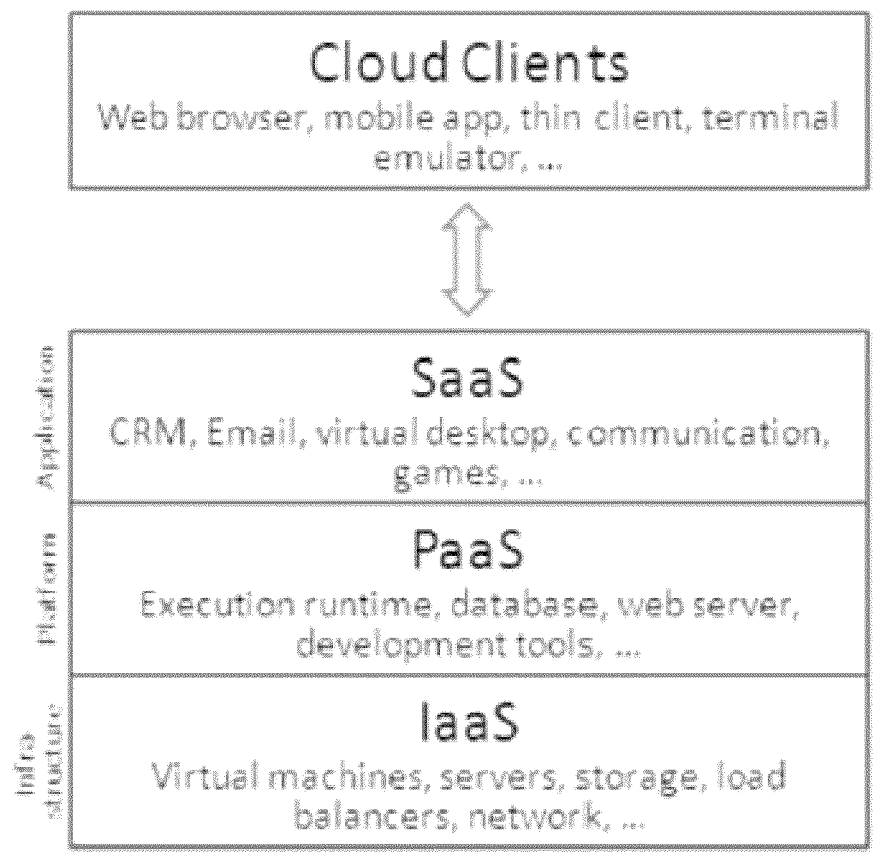

For purposes of the instant description, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user). In some embodiments, the instant invention offers/manages the cloud computing/architecture as, but not limiting to: infrastructure a service (IaaS), platform as a service (PaaS), and software as a service (SaaS). FIGS. 20 and 21 illustrate schematics of exemplary implementations of the cloud computing/architecture.

Of note, the embodiments described herein may, of course, be implemented using any appropriate computer system hardware and/or computer system software. In this regard, those of ordinary skill in the art are well versed in the type of computer hardware that may be used (e.g., a mainframe, a mini-computer, a personal computer ("PC"), a network (e.g., an intranet and/or the internet)), the type of computer programming techniques that may be used (e.g., object oriented programming), and the type of computer programming languages that may be used (e.g., C++, Basic, AJAX, Javascript). The aforementioned examples are, of course, illustrative and not restrictive.

In some embodiments, the instant invention provides a the instant invention provides a computer-implemented method that includes at least steps of: receiving, by a specifically programed processing computer system, an electronic Tender voting request to conduct at least one Tender voting; where the electronic Tender voting request identifies at least the following: i) at least one security of at least one issuer, and ii) a Tender deadline for the at least one Tender voting to submit Tender votes, iii) at least one condition of the at least one Tender voting; where the at least one Tender voting is limited to a plurality of employees who has owned shares of the at least one issuer at a record date via at least one of: i) at least one 401K plan, and ii) at least one employee stock ownership plan (ESOP); where the at least one Tender voting is selected from the group of Tender voting types consisting of: i) a Tender offer, ii) an All-or-None Tender offer, and iii) a Dutch Tender auction; based on the electronic Tender voting request, identifying, by the specifically programed processing computer system, the plurality of employees who own the shares of the at least one issuer on the record date; generating, by the specifically programed processing computer system, a Tender control number for each employee of the plurality of employees; where the Tender control number includes at least at least one Tender tag; where the Tender control number is associated in data records with at least: i) such employee, and ii) an amount of the shares of the at least one issuer that such employee has owned on the record date; transmitting, by the specifically programed processing computer system, to each employee of the plurality of employees, a Tender vote invitation to submit a Tender vote in the at least one Tender voting; where the Tender vote invitation includes at least the Tender control number encoded within the Tender vote invitation; receiving, by the specifically programed processing computer system, the Tender control number from a respective employee; in response to the receiving the Tender control number, generating, by the specifically programed processing computer system, a plurality of programmed visual computer screens to allow such respective employee to submit the Tender vote; where the plurality of programmed visual computer screens are configured to at least: i) show at least one entry choice based on a particular Tender voting type, ii) automatically calculate at least the following: a reminder of shares to be Tender voted based on a number of shares identified by such respective employee in a first entry choice; a total percentage of shares allocated by such respective employee during the Tender voting; iii) confirm such respective employee's Tender vote; iv) allow such respective employee to automatically change a previous Tender vote when such respective employee revises the previous Tender vote before the Tender deadline; recording, in real time, by the specifically programed processing computer system, a plurality of Tender votes of the plurality of employees as submitted Tender votes; and dynamically outputting, by the specifically programed processing computer system, at least one report identifying a progress of the at least one Tender voting.

In some embodiments, the at least one report can be based on at least one of the following criteria: i) a security name, ii) a job number, iii) an election date, iv) an election time, v) a CUSIP, vi) at least one class, vii) an account number, viii) a number of shares, ix) a percentage tendered, x) a percentage not tendered, xi) Tendered shares, xii) the Tender control number, and xiii) election shares. In some embodiments, the at least one report can be based on at least one of the following: i) historical information regarding all instructions for every Tender control number; and ii) cumulative information regarding a final instruction for every Tender control number. In some embodiments, the plurality of programmed visual computer screens are further configured to at least: generate at least one error message when at least one submission of such respective employee for the at least one entry choice violates at least one pre-determine Tender rule, Tender calculation, or both. In some embodiments, the Tender vote invitation includes at least at least one URL encoded with the Tender control number. In some embodiments, the receiving the Tender control number from such respective employee further includes at least: receiving the Tender control number in response to an activation at least one URL encoded with the Tender control number by such respective employee. In some embodiments, the Tender vote invitation includes at least at least one visual presentation code encoded with the Tender control number.

In some embodiments, the instant invention provides a specifically programmed system that includes at least the following components: at least one programmed computer, having a non-transient computer tangible readable medium having stored thereon software instructions executable by at least one processor of the computer, where the software instructions include at least: code to receive an electronic Tender voting request to conduct at least one Tender voting; where the electronic Tender voting request identifies at least the following: i) at least one security of at least one issuer, and ii) a Tender deadline for the at least one Tender voting to submit Tender votes, iii) at least one condition of the at least one Tender voting; where the at least one Tender voting is limited to a plurality of employees who has owned shares of the at least one issuer at a record date via at least one of: i) at least one 401K plan, and ii) at least one employee stock ownership plan (ESOP); where the at least one Tender voting is selected from the group of Tender voting types consisting of: i) a Tender offer, ii) an All-or-None Tender offer, and iii) a Dutch Tender auction; based on the electronic Tender voting request, code to identify the plurality of employees who own the shares of the at least one issuer on the record date; code to generate a Tender control number for each employee of the plurality of employees; where the Tender control number includes at least at least one Tender tag; where the Tender control number is associated in data records with at least: i) such employee, and ii) an amount of the shares of the at least one issuer that such employee has owned on the record date; code to transmit, to each employee of the plurality of employees, a Tender vote invitation to submit a Tender vote in the at least one Tender voting; where the Tender vote invitation includes at least the Tender control number encoded within the Tender vote invitation; code to receive the Tender control number from a respective employee; in response to the receiving the Tender control number, code to generate a plurality of programmed visual computer screens to allow such respective employee to submit the Tender vote; where the plurality of programmed visual computer screens are configured to at least: i) show at least one entry choice based on a particular Tender voting type, ii) automatically calculate at least the following: a reminder of shares to be Tender voted based on a number of shares identified by such respective employee in a first entry choice; a total percentage of shares allocated by such respective employee during the Tender voting; iii) confirm such respective employee's Tender vote; iv) allow such respective employee to automatically change a previous Tender vote when such respective employee revises the previous Tender vote before the Tender deadline; code to record, in real time, a plurality of Tender votes of the plurality of employees as submitted Tender votes; and code to dynamically output at least one report identifying a progress of the at least one Tender voting.

While a number of embodiments of the present invention have been described, it is understood that these embodiments are illustrative only, and not restrictive, and that many modifications may become apparent to those of ordinary skill in the art. Further still, the various steps may be carried out in any desired order (and any desired steps may be added and/or any desired steps may be eliminated).

What is claimed is:
1. A computer-implemented method, comprising:
 receiving, by a specifically programed processing computer system, an electronic Tender voting request to conduct at least one Tender voting;
 wherein the electronic Tender voting request is representative of utilizing a paper Tender card to conduct the at least one Tender voting;
 wherein the electronic Tender voting request identifies at least the following:
  i) at least one security of at least one issuer, and
  ii) a Tender deadline for the at least one Tender voting to submit Tender votes,
  iii) at least one condition of the at least one Tender voting;
 wherein the at least one Tender voting is limited to a plurality of employees who has owned shares of the at least one issuer at a record date via at least one of:
  i) at least one 401K plan, and
  ii) at least one employee stock ownership plan (ESOP);
 wherein the at least one Tender voting is selected from the group of Tender voting types consisting of:
  i) a Tender offer,
  ii) an All-or-None Tender offer, and
  iii) a Dutch Tender auction;
 based on the electronic Tender voting request, identifying, by the specifically programed processing computer system, the plurality of employees who own the shares of the at least one issuer on the record date;
 generating, by the specifically programed processing computer system, a Tender control number for each employee of the plurality of employees;
  wherein the Tender control number comprises at least one Tender tag;
  wherein the Tender control number is associated in data records with at least:
   i) such employee, and
   ii) an amount of the shares of the at least one issuer that such
  employee has owned on the record date;
 transmitting, by the specifically programed processing computer system, to each employee of the plurality of employees, a Tender vote invitation to submit a Tender vote in the at least one Tender voting;
 wherein the Tender vote invitation comprises the Tender control number encoded within the Tender vote invitation;
 receiving, by the specifically programed processing computer system, the Tender control number from a respective employee;
 in response to the receiving the Tender control number, generating, by the specifically programed processing computer system, a plurality of programmed visual computer screens to allow such respective employee to submit the Tender vote;
 facilitating, by the specifically programed processing computer system the at least one Tender voting by such respective employee through at least:
  i) allowing, via the plurality of programmed visual computer screens, such respective employee to identify a first number of shares which such respective employee desires to tender based on a particular Tender voting type;
  ii) automatically calculating, by the specifically programed processing computer system, and displaying, via the plurality of programmed visual computer screens, to such respective employee at least the following:
   1) a reminder of shares owned by such respective employee and are left to be tendered after such respective employee tenders the first number of shares, and
   2) a total percentage of shares tendered by such respective employee during the Tender voting based on a total number of shares owned by such respective employee;

iii) allowing, via the plurality of programmed visual computer screens, such respective employee to confirm such respective employee's Tender vote;

iv) allowing, via the plurality of programmed visual computer screens, such respective employee to automatically change a previous Tender vote of such respective employee when such respective employee revises the previous Tender vote before the Tender deadline;

v) in real-time, making, by the specifically programed processing computer system, a change in the at least one condition of the at least one Tender voting and displaying, via the plurality of programmed visual computer screens, at least one changed condition of the at least one Tender voting to such respective employee; and vi) in real-time, allowing, via the plurality of programmed visual computer screens, such respective employee to withdraw the at least one Tender voting;

recording, in real time, by the specifically programed processing computer system, a plurality of Tender votes of the plurality of employees as submitted Tender votes; and dynamically outputting, by the specifically programed processing computer system, at least one report identifying a progress of the at least one Tender voting.

2. The method of claim 1, wherein the at least one report can be based on at least one of the following criteria:
i) a security name, ii) a job number, iii) an election date, iv) an election time, v) a CUSIP, vi) at least one class, vii) an account number, viii) a number of shares, ix) a percentage tendered, x) a percentage not tendered, xi) Tendered shares, xii) the Tender control number, and xiii) election shares.

3. The method of claim 1, wherein the at least one report can be based on at least one of the following:
i) historical information regarding all instructions for every Tender control number, and ii) cumulative information regarding a final instruction for every Tender control number.

4. The method of claim 1, wherein the plurality of programmed visual computer screens are further configured to at least:
generate at least one error message when at least one submission of such respective employee violates at least one pre-determined Tender rule, at least one pre-determined Tender calculation, or both.

5. The method of claim 1, wherein the Tender vote invitation comprises at least one URL encoded with the Tender control number.

6. The method of claim 5, wherein the receiving the Tender control number from such respective employee further comprises:
receiving the Tender control number in response to an activation, by such respective employee, of at least one URL encoded with the Tender control number.

7. The method of claim 1, wherein the Tender vote invitation comprises at least one visual presentation code encoded with the Tender control number.

8. A computer system, comprising:
at least one programmed computer, having a non-transient computer tangible readable medium having stored thereon software instructions executable by at least one processor of the computer, wherein the software instructions comprise:
code to receive an electronic Tender voting request to conduct at least one Tender voting;

wherein the electronic Tender voting request is representative of utilizing a paper Tender card to conduct the at least one Tender voting;

wherein the electronic Tender voting request identifies at least the following:
i) at least one security of at least one issuer, and
ii) a Tender deadline for the at least one Tender voting to submit Tender votes,
iii) at least one condition of the at least one Tender voting;

wherein the at least one Tender voting is limited to a plurality of employees who has owned shares of the at least one issuer at a record date via at least one of:
i) at least one 401K plan, and
ii) at least one employee stock ownership plan (ESOP);

wherein the at least one Tender voting is selected from the group of Tender voting types consisting of:
i) a Tender offer,
ii) an All-or-None Tender offer, and
iii) a Dutch Tender auction;

based on the electronic Tender voting request, code to identify the plurality of employees who own the shares of the at least one issuer on the record date;

code to generate a Tender control number for each employee of the plurality of employees;
wherein the Tender control number comprises at least one Tender tag;
wherein the Tender control number is associated in data records with at least:
i) such employee, and
ii) an amount of the shares of the at least one issuer that such
employee has owned on the record date;

code to transmit, to each employee of the plurality of employees, a Tender vote invitation to submit a Tender vote in the at least one Tender voting;

wherein the Tender vote invitation comprises the Tender control number encoded within the Tender vote invitation;

code to receive the Tender control number from a respective employee;

in response to the receiving the Tender control number, code to generate a plurality of programmed visual computer screens to allow such respective employee to submit the Tender vote;

wherein the software instructions facilitate the at least one Tender voting by such respective employee through at least:
i) allowing, via the plurality of programmed visual computer screens, such respective employee to identify a first number of shares which such respective employee desires to tender based on a particular Tender voting type;
ii) automatically calculating and displaying, via the plurality of programmed visual computer screens, to such respective employee at least the following:
1) a reminder of shares owned by such respective employee and are left to be tendered after such respective employee tenders the first number of shares, and
2) a total percentage of shares tendered by such respective employee during the Tender voting based on a total number of shares owned by such respective employee;
iii) allowing, via the plurality of programmed visual computer screens, such respective employee to confirm such respective employee's Tender vote;

iv) allowing, via the plurality of programmed visual computer screens, such respective employee to automatically change a previous Tender vote of such respective employee when such respective employee revises the previous Tender vote before the Tender deadline;

v) in real-time, making a change in the at least one condition of the at least one Tender voting and displaying, via the plurality of programmed visual computer screens, at least one changed condition of the at least one Tender voting to such respective employee; and vi) in real-time, allowing, via the plurality of programmed visual computer screens, such respective employee to withdraw the at least one Tender voting;

code to record, in real time, a plurality of Tender votes of the plurality of employees as submitted Tender votes; and code to dynamically output at least one report identifying a progress of the at least one Tender voting.

9. The system of claim 8, wherein the at least one report can be based on at least one of the following criteria: xiv) a security name, xv) a job number, xvi) an election date, xvii) an election time, xviii) a CUSIP, xix) at least one class, xx) an account number, xxi) a number of shares, xxii) a percentage tendered, xxiii) a percentage not tendered, xxiv) Tendered shares, xxv) the Tender control number, and xxvi) election shares.

10. The system of claim 8, wherein the at least one report can be based on at least one of the following: i) historical information regarding all instructions for every Tender control number, and ii) cumulative information regarding a final instruction for every Tender control number.

11. The system of claim 8, wherein the plurality of programmed visual computer screens are further configured to at least:

generate at least one error message when at least one submission of such respective employee violates at least one pre-determined Tender rule, at least one pre-determined Tender calculation, or both.

12. The system of claim 11, wherein the Tender vote invitation comprises at least one URL encoded with the Tender control number.

13. The system of claim 12, wherein the code to receive the Tender control number from such respective employee further comprises:

code to receive the Tender control number in response to an activation, by such respective employee, of at least one URL encoded with the Tender control number.

14. The system of claim 8, wherein the Tender vote invitation comprises at least one visual presentation code encoded with the Tender control number.

* * * * *